(12) United States Patent
Buckley et al.

(10) Patent No.: US 6,942,075 B2
(45) Date of Patent: Sep. 13, 2005

(54) BRAKE SYSTEM HAVING BOOSTED HYDRAULIC ACCUMULATOR

(75) Inventors: James A. Buckley, Whitefish Bay, WI (US); Scott A. Walterman, Milwaukee, WI (US); Brian Bigsby, Evans, GA (US)

(73) Assignees: Hayes Brake, LLC, Mequon, WI (US); Textron, Inc., Providence, RI (US)

( * ) Notice: Subject to any disclaimer, the term of this patent is extended or adjusted under 35 U.S.C. 154(b) by 0 days.

(21) Appl. No.: 10/900,616

(22) Filed: Jul. 28, 2004

(65) Prior Publication Data

US 2004/0262108 A1 Dec. 30, 2004

Related U.S. Application Data

(60) Division of application No. 10/308,970, filed on Dec. 3, 2002, now Pat. No. 6,796,407, which is a continuation-in-part of application No. 09/914,867, filed as application No. PCT/US00/05427 on Mar. 2, 2000.

(60) Provisional application No. 60/122,405, filed on Mar. 2, 1999.

(51) Int. Cl.[7] .............................. B60J 11/00; G05G 1/14
(52) U.S. Cl. .......................... 188/359; 188/360; 74/512
(58) Field of Search ................................ 188/358, 359, 188/360, 73.1, 73.31; 74/512

(56) References Cited

U.S. PATENT DOCUMENTS

| | | |
|---|---|---|
| 2,816,633 A | 12/1957 | Schumann |
| 3,869,027 A | 3/1975 | Chlebowski |
| 4,076,093 A | 2/1978 | Mizuno |
| 4,278,143 A | 7/1981 | Nagai .......................... 180/282 |
| 4,301,901 A | 11/1981 | Jensen ..................... 192/219.6 |
| 4,310,064 A | 1/1982 | Kazarian, Jr. |
| 4,315,441 A | 2/1982 | Fukuda |
| 4,841,798 A | 6/1989 | Porter et al. ................ 74/501.5 |
| 4,867,289 A | 9/1989 | Wooters |
| 5,020,643 A | 6/1991 | Redenbarger |
| 5,058,462 A | 10/1991 | Killiany et al. |
| 5,309,786 A | 5/1994 | Pare et al. ...................... 74/512 |
| 5,588,335 A | 12/1996 | Strait |
| 5,785,156 A | 7/1998 | Warwick et al. |
| 5,890,545 A | 4/1999 | Smith et al. |
| 6,223,865 B1 | 5/2001 | Lang et al. |
| 6,457,568 B2 | 10/2002 | Lang et al. ............... 188/73.31 |
| 6,648,105 B2 | 11/2003 | Lang et al. ............... 188/73.31 |
| 6,662,915 B2 | 12/2003 | Bigsby ....................... 188/359 |
| 6,796,407 B2 * | 9/2004 | Buckley et al. ............. 188/359 |
| 2001/0040074 A1 | 11/2001 | Lang et al. ............... 188/73.31 |
| 2002/0189909 A1 | 12/2002 | Buckley et al. .......... 188/73.31 |
| 2003/0010581 A1 | 1/2003 | Lang et al. ............... 188/73.31 |
| 2003/0106754 A1 | 6/2003 | Buckley et al. ............. 188/359 |
| 2003/0164057 A1 | 9/2003 | Buckley et al. ................ 74/512 |

FOREIGN PATENT DOCUMENTS

| WO | 00/51866 | 8/2000 |
|---|---|---|

\* cited by examiner

*Primary Examiner*—Christopher P. Schwartz
(74) *Attorney, Agent, or Firm*—Whyte Hirschboeck Dudek SC

(57) ABSTRACT

A hydraulic brake system includes a hydraulic accumulator that stores much of the energy generated upon brake pedal depression. The stored energy can be used to maintain the brakes in their fully engaged state and to help return an applied brake pedal to its released position, in which case return fluid flow to the master cylinder is damped to avoid undesirable severe kickback of the brake pedal. A booster is provided to automatically boost the energy storage capacity of the accumulator during normal brake and hold cycles in order to provide sufficient energy accumulation to compensate for relatively severe pressure drops occurring, e.g., during prolonged periods of storage at extremely low temperatures. The booster may comprise an indexing arm that is acted upon by the system's brake pedal to selectively move a variable thickness spacer on the indexing arm into and out of engagement with the accumulator.

1 Claim, 33 Drawing Sheets

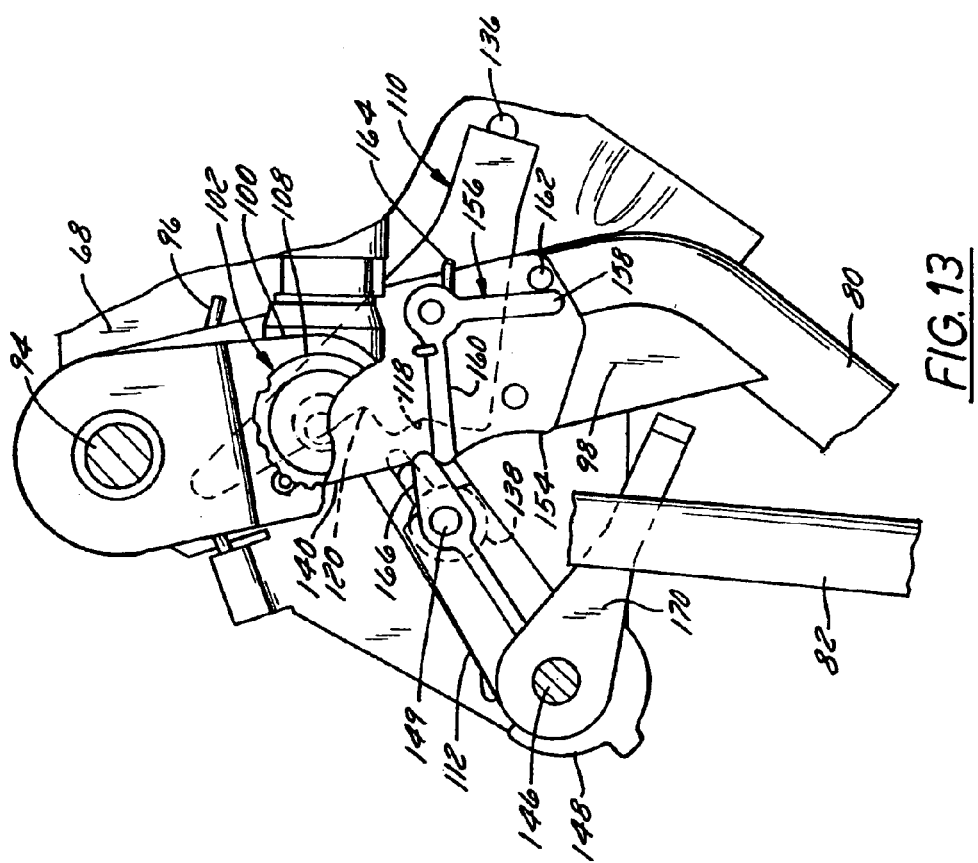

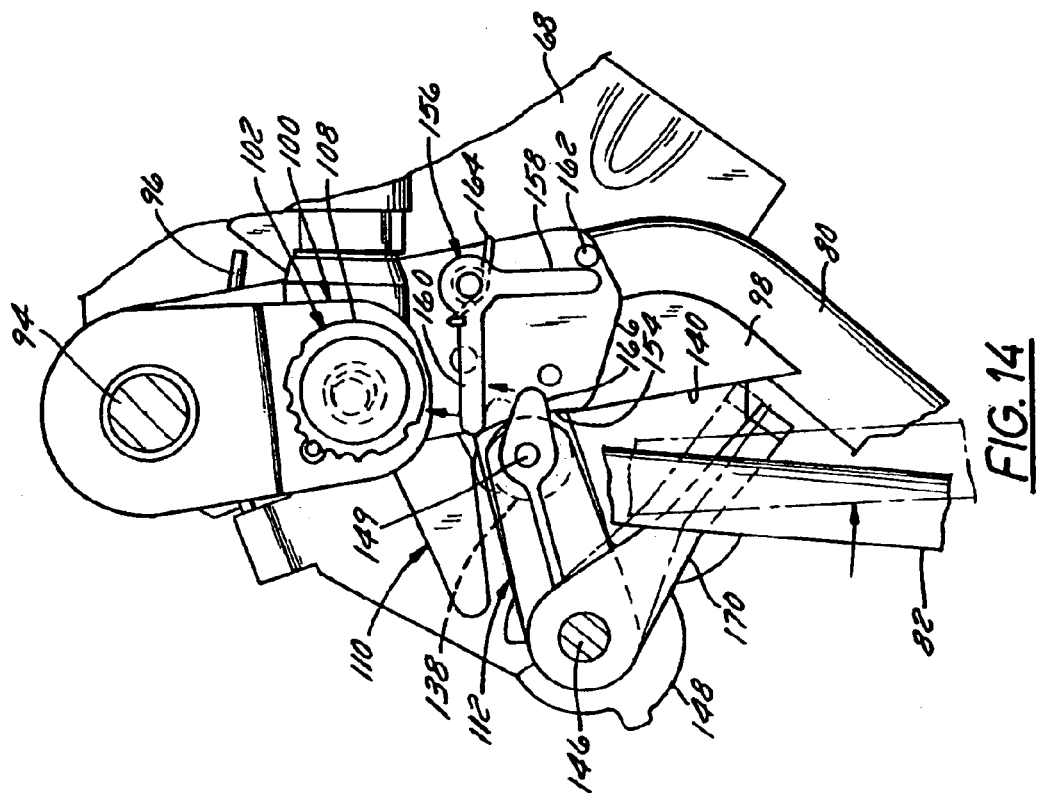
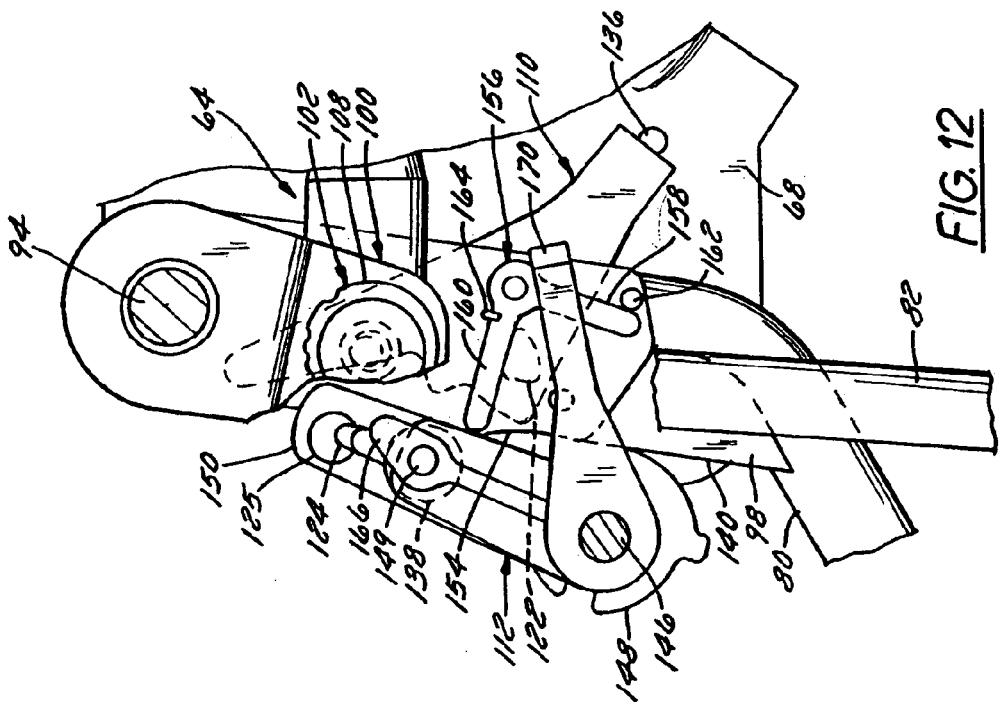

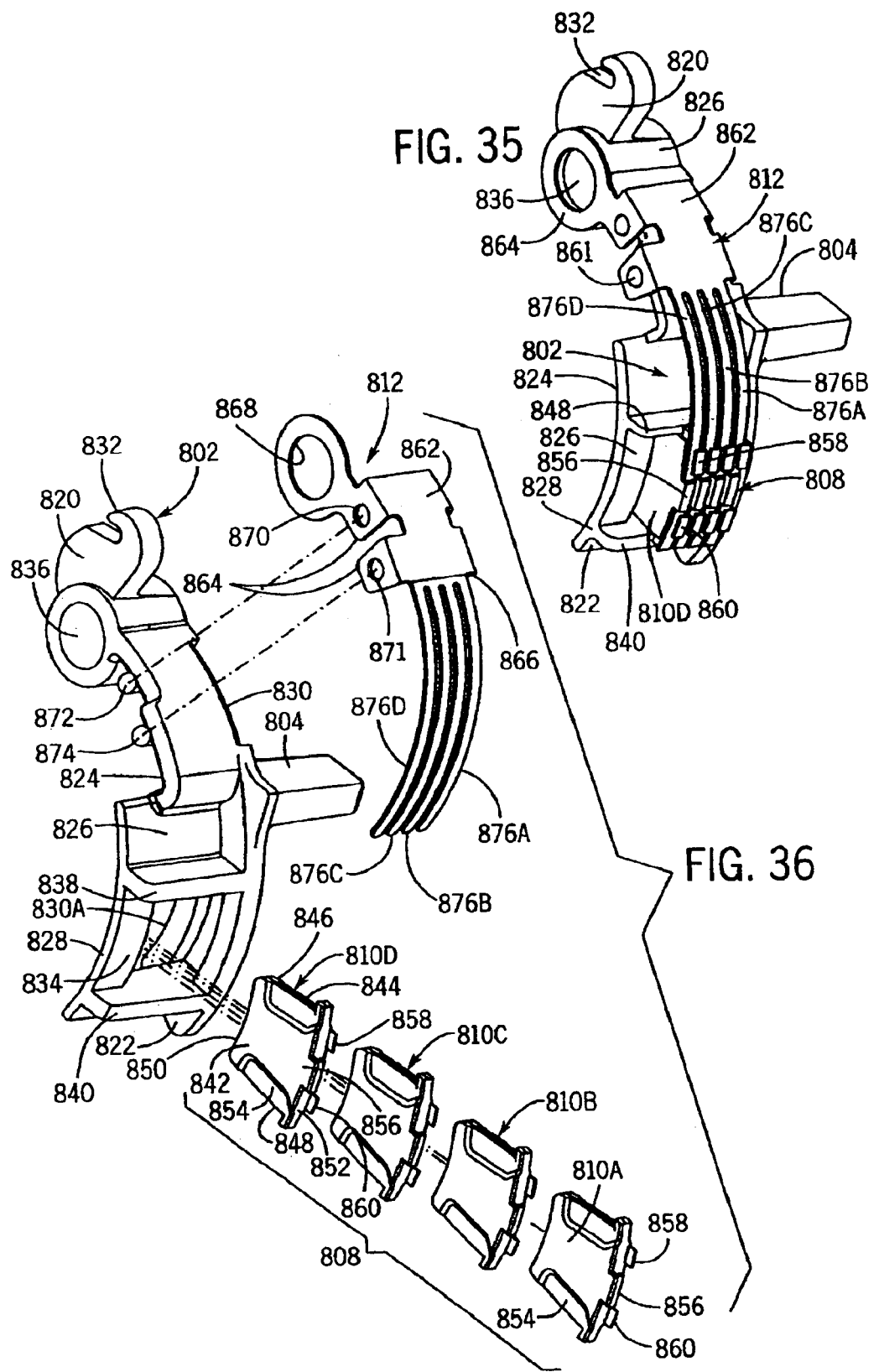

BRAKE SYSTEM HAVING BOOSTED HYDRAULIC ACCUMULATOR

CROSS REFERENCE TO RELATED APPLICATIONS

This application is a divisional of U.S. patent application Ser. No. 10/308,970, filed Dec. 3, 2002 U.S. Pat. No. 6,796,407, which is a continuation-in-part of U.S. patent application Ser. No. 09/914,867, filed Mar. 13, 2002, which is a national phase of PCT Application Ser. No. PCT/US00/05427, filed Mar. 2, 2000, which claims the benefit of priority of U.S. Provisional Application Ser. No. 60/122,405, filed Mar. 2, 1999, the entire contents of each of which are hereby expressly incorporated by reference into the present application.

BACKGROUND OF THE INVENTION

1. Field of the Invention

The invention relates to a hydraulic combined service brake/park and hold brake system having an accumulator and a booster that automatically boosts the energy storage capacity of the accumulator during the first brake braking cycle(s) to compensate, e.g., for volumetric changes in the system that might take place during prolonged periods of non-use under dropping-temperature conditions. The invention additionally relates to a method of using such a system.

2. Discussion of the Related Art

Many vehicles employ a parking brake system or arrangements operative to maintain the service brake(s) of the system in an engaged condition during parking. These "park and hold brake" systems frequently employ a mechanism associated with a primary brake pedal to selectively latch the brake pedal in a locked position in which its brakes are engaged, while enabling brake pedal release when the operator wishes to effect further movement of the vehicle. See, for example, U.S. Pat. Nos. 1,927,209, 1,985,319, 2,551,743, 2,816,333, 4,036,078, 4,218,936, 4,310,064, and 4,867,829. The brakes of most of these systems are operated by depressing the brake pedal and are locked and/or unlocked by operating a secondary pedal or pad located on or near the primary brake pedal. See, for example, U.S. Pat. Nos. 4,306,078 and 4,867,289.

In the case of relatively small utility and recreational vehicles which undergo frequent stopping, such as golf cars and the like, it is particularly important from a safety standpoint to be capable of holding the vehicle in a stopped position when on an upwardly or downwardly inclined grade. For example, safety regulations require that certain vehicles, such as golf cars, be capable of maintaining a braked condition on a 30% grade under full load for a substantial period of time. Most of these small vehicles employ mechanical, cable-actuated brake systems for both service braking and park and hold braking. While these mechanical systems are acceptable for many applications, they exhibit marked disadvantages when compared to hydraulic brake systems of the type employed by most heavy-duty vehicles. For instance, due at least in part to the fact that mechanical brake systems exhibit substantial hysterisis when compared to hydraulic systems, the operator of the typical mechanical brake system must impose a substantial force to the primary brake pedal to effect braking of the typical mechanical brake system, and a similar force is required to actuate an associated brake locking arrangement. These mechanical brake systems also require a relatively large force to release the brake pedal from its locked position. A further disadvantage resulting from the relatively large operating forces required to actuate and/or release mechanical brake systems is the need for high strength structural components to withstand continued service without associated maintenance problems. The key advantage to reducing the brake system hysterisis is braking control. A lower hysterisis system can have its braking torque increased or reduced easily. A higher hysterisis system feels "sticky."

The park and hold brakes of some small vehicles can be released by selective actuation of either an auxiliary lever or pedal located on or near the brake pedal or by the accelerator pedal. However, brake release in systems of this type typically requires that the accelerator pedal must be depressed through a substantial stroke and/or against substantial resistance to accelerator pedal movement. As a result, the operator must impart so much force to release the brakes that the accelerator pedal is driven through a substantial percentage of its service stroke before the brakes are released, resulting in near-instantaneous and relatively rapid vehicle acceleration upon brake release. The vehicle therefore jerks forward at substantial operator discomfort and at the risk of loss of vehicle control.

The brake pedals of many park and hold brake systems are locked by a dog and detent mechanism that has one or more latching points and that therefore can permit the vehicle's brakes to be locked in a number of progressively-more heavily braked settings. At least the lightest settings of some of these multipoint latching systems might not produce a strong enough holding force to assure adequate braking on steep slopes. This problem can be avoided through the use of a single latching point system that latches the brake pedal at or beyond a location at which the vehicle's brakes lock the wheels from rotation. However, single latching point systems usually exhibit a pronounced snapback effect and high efforts to set on the brake pedal (produced by the rapid release of accumulated energy from a fully-engaged brake) that produces an undesirable, relatively loud noise and system hammering and that produces substantial wear and tear on the brake pedal and related components. In some systems, this snap back can be so severe as to risk operator injury.

Another problem associated with systems having either single point latching or multipoint latching is that the latching components of these systems contact one another at several different points in both the latching and unlatching operations, producing several distinct audible clicks that may confuse the operator into believing that the brakes are locked when they are not and/or that the brakes have been released when they are still locked.

Yet another problem associated with known hydraulic combined service brake/park and hold brake systems is that they lack any structure that ensures pressure retention in the brakes in the event of gradual relatively minor pressure reduction in the system. This gradual pressure reduction, generally is known as "creep," may occur, e.g., due to fluid seepage into seals and other elastomeric components of the brake system as well as leakage at metal to metal seal points. Absent some mechanism to make up for the holding energy lost due to creep, the brake holding forces may decrease over time to a level that that risks unintended partial brake release and consequent unwanted vehicle movement.

Thus, a need exists for an economical and reliable brake system 1) which uses the same hydraulic brakes for both service braking and park and hold braking, and 2) which is relatively simple to actuate both to latch and unlatch the brake pedal during park and hold.

The need also exists for either a hydraulic or mechanical park and hold brake system that can be released by actuation of an accelerator pedal with minimal effort on the part of the operator, thereby permitting the operator to "feather" accelerator pedal operation and provide smooth, gradual vehicle acceleration.

There is also a need to store some of the energy generated manually upon actuation of a brake pedal of a hydraulically actuated park and hold brake system and to permit that energy to be released as needed to make up for the minor seal creep that may occur over time.

The need also exists to damp brake pedal return following a braking operation so as to reduce wear on brake system components and to reduce or eliminate operator discomfort associated with pedal snapback and to give the system a quality feel.

A problem associated with accumulator-equipped hydraulic park and hold braking systems is that the accumulator of the system may not store sufficient energy to make up for higher magnitude fluid pressure losses resulting, e.g., from severe temperature drops. That is, a well-designed accumulator will store sufficient energy upon brake latching to maintain the brakes in their applied condition despite low magnitude volumetric changes in the system. However, an accumulator may be incapable of storing sufficient energy to compensate for larger pressure changes resulting, e.g., from severe temperature drops. For instance, the brakes of a golf car or similar vehicle may be latched on a relatively warm autumn day, and the vehicle may then be stored through the winter, where it is subject to a temperature drop of 70° F. The braking system may suffer such a severe volumetric change and resultant pressure drop as a result of this temperature drop that the system's accumulator cannot store enough energy to pressurize the system sufficiently to maintain the brakes in their engaged condition. The "creep" that otherwise would be avoided through the incorporation of an accumulator into the system may therefore still present a problem. This pressure loss and resultant strain on the accumulator are especially dramatic in relatively poorly bled systems having relatively large quantities of air in the hydraulic fluid.

An accumulator equipped system could conceivably be designed to compensate for temperature-dependent volumetric-based pressure losses simply by oversizing the accumulator sufficiently to store the additional energy required to compensate for the additional pressure drop resulting from the pronounced temperature drop. However, energizing the oversized accumulator would noticeably increase the effort required to latch the brakes, particularly if the accumulator were manually energized by actuation of the system's brake pedal. Space constraints also prohibit accumulator oversizing in some applications.

These problems could be alleviated by incorporating a manually actuated booster in the system that boosts the energy storage capacity of a brake system's accumulator. However, a manually actuated booster would require the manual manipulation of a slide or similar device to engage the booster. Specifically, when an operator of this type of system desires to park the vehicle for a long term, he or she would have to depress the brake pedal while simultaneously manually actuating the booster, thus blocking the accumulator from returning to its fully released or "home" position. The operator could then release the brake pedal and reapply it to get the advantage of a two-step boost. Once the vehicle incorporating this hypothetical system is parked, the slide or similar device would spring back out of engagement with the accumulator, and the accumulator is free to use all the accumulated energy the boost had afforded. This system would require the operator to be aware of the park function and to use it when appropriate.

The need has therefore arisen to provide a booster that automatically increases the energy storage capacity of an accumulator of a hydraulic park and hold brake system upon normal manipulation of a brake pedal.

SUMMARY OF THE INVENTION

Pursuant to one aspect of the invention, the need for an effective accumulator booster is met in a vehicular brake system comprising, at least one hydraulically actuated vehicle brake, a master cylinder, an accumulator, and a booster. The master cylinder has an inlet in fluid communication with a hydraulic fluid reservoir and an outlet in fluid communication with the brake. It is configured to be latched in an actuated position thereof to hold the brake in an engaged condition. The accumulator is dimensioned and configured to store energy generated by the master cylinder during an energy storage phase of a braking cycle master cylinder and to use the energy to assist in holding the brake in the engaged condition when the master cylinder is locked in the actuated position thereof. The booster is coupled to the accumulator and is automatically operated during a braking cycle to boost a magnitude of energy stored by the accumulator during an energy storage phase of a subsequent braking cycle without requiring manual deactivation of the booster.

In a preferred embodiment in which the accumulator comprises a spring which is compressed upon master cylinder actuation to store energy, the booster interacts with the accumulator such that the spring is compressed more during the energy storage phase of the subsequent braking cycle than during the energy storage phase of the first braking cycle.

The booster may be employed in a system that includes a brake pedal that is manually actuatable to at least indirectly actuate the master cylinder and the booster, the brake pedal being movable during a brake and hold cycle from a released position, through a service braking stroke in which the master cylinder is actuated to apply the brake, to a latched position in which the master cylinder is latched in the actuated position to hold the brake in the applied condition, and back to the released position. In this case, the booster preferably automatically engages the accumulator following unlatching of a latched brake pedal and is held out of active engagement with the accumulator during the energy storage phase.

In accordance with a preferred embodiment, the booster comprise an indexing arm and a spacer that is mounted on the indexing arm and that has a variable effective thickness. The indexing arm cooperates with the brake pedal such that, upon movement of the brake pedal toward the released position from the latched position, the indexing arm swings into an engaged position in which at least a portion of the spacer is lodged between an axial surface of the accumulator and a surface of the support. The booster may further comprise 1) an actuator arm which is driven by the brake pedal to move away from the accumulator, and 2) a return spring which urges the indexing arm toward the accumulator at all times. Alternatively, the return spring could urge the indexing arm away from the accumulator, and the brake pedal could drive the indexing arm toward the accumulator. The spacer may comprise a stack of spacer plates that are mounted on the indexing arm, in which case the effective thickness of the spacer is determined by the number of spacer plates that act upon the accumulator.

Of course, the booster may be supplied separately from the remainder of the brake system and even installed in existing systems on a retrofit basis. Hence, in accordance with this aspect of the invention, a brake booster is provided that includes an indexing arm, an actuator arm, and a variable thickness spacer. The indexing arm is configured for pivotal mounting on a surface of a brake system. It has inner and outer surfaces and front and rear surfaces. The actuator arm is coupled to the indexing arm, extends beyond the rear surface of the indexing arm, and is configured for engagement with a brake pedal. The spacer is mounted on the indexing arm and is configured to selectively lodge between an axial surface of an accumulator and another surface of the brake system when the indexing arm is driven into an engaged position thereof in response to release of the brake pedal from a latched position thereof. The spacer preferably is formed from a number of sequentially engageable subspacers such as a stack of spacer plates.

In accordance with yet another aspect of the invention, a method of boosting the energy storage capacity of a brake system's accumulator includes 1) actuating a brake pedal of a vehicular brake system from a released position and through a brake and latch phase of a first braking cycle to sequentially apply at least one hydraulically actuated brake of the vehicle and latch the brake in the applied condition, wherein, during at least a latter portion of the brake and latch phase, an accumulator is energized at least indirectly by movement of the brake pedal to store energy in the accumulator; then 2) releasing the brake pedal during a return phase of the first braking cycle to return the brake to the released position, wherein, during the return phase, only a portion of the energy stored by the accumulator during the first actuating step is released, and then 3) actuating the brake pedal through a brake and latch phase of a second braking cycle to sequentially apply the brake and latch the brake in the applied condition and to store energy in the accumulator, wherein a magnitude of energy stored by the accumulator during the second braking cycle is greater than a magnitude of energy stored during the first braking cycle. The energy is preferably stored incrementally over a number of N braking cycles. Then, during M additional braking cycles (where N and M are both greater than 1), the accumulator preferably stores at least essentially the same magnitude of the energy during each of the N+1st through Mth braking cycles. In this case, at least essentially the same magnitude of energy during the release phase of each of the N+1st through Mth braking cycles.

BRIEF DESCRIPTION OF THE DRAWINGS

A preferred exemplary embodiment of the invention is illustrated in the accompanying drawings in which like reference numerals represent like parts throughout, and in which:

FIGS. 12–14 are inboard side-elevation views of a portion of the subassembly of FIGS. 7–11, illustrating the subassembly in different operational states;

FIG. 35 is a perspective view of the booster of the assembly of FIGS. 32–34;

FIG. 36 is an exploded perspective view of the booster of FIG. 35;

DETAILED DESCRIPTION OF THE PREFERRED EMBODIMENTS

1. Resume

Pursuant to a preferred embodiment of the invention, a hydraulic brake system is provided for a vehicle such as a golf car or the like that uses the same brakes and same brake pedal for both service braking and park and hold braking. The system additionally includes a hydraulic accumulator that stores much of the energy generated upon brake pedal depression. The stored energy can be used to maintain the brakes in their fully engaged state and to help return an applied brake pedal to its released position, in which case return fluid flow to the master cylinder is damped to avoid undesirable severe kickback of the brake pedal. A booster is provided to automatically boost the energy storage capacity of the accumulator during normal brake and hold cycles in order to provide sufficient energy accumulation to compensate for relatively severe pressure drops occurring, e.g., during prolonged periods of storage at decreasing temperatures.

2. System Overview

The invention, particularly various components thereof, is applicable to virtually any light-duty vehicular braking application and even to many medium-duty and heavy-duty applications. It is particularly well suited for use on vehicles whose brakes are subjected to a high-duty cycle under relatively extreme environmental conditions, and the system allows all wheel service and park braking. It will therefore be described in conjunction with a golf car, although it be understood that it is applicable to a wide variety of other applications as well.

Figure 1:
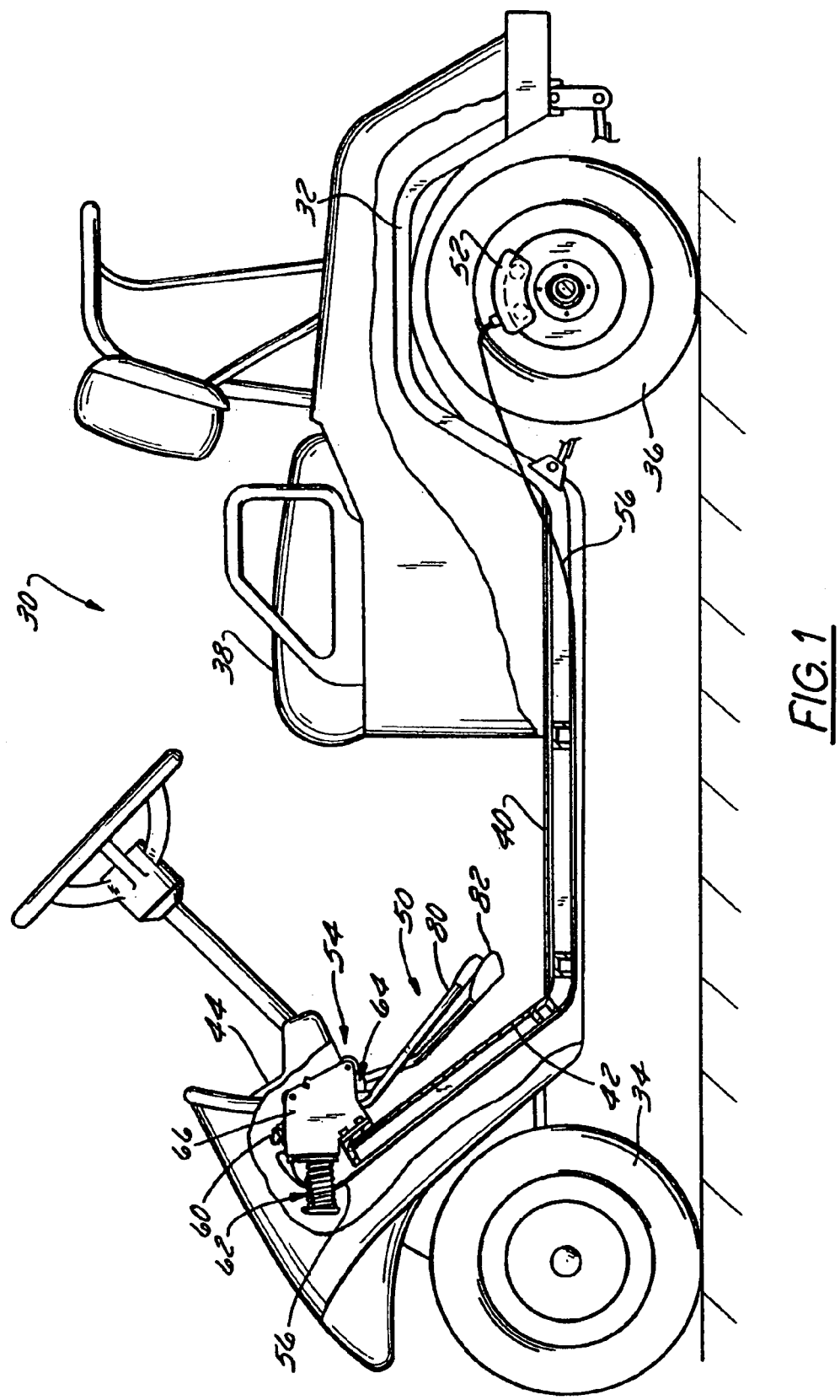
FIG. 1 is a somewhat schematic cutaway side-elevation view of a golf car employing a hydraulic brake system constructed in accordance with a preferred embodiment of the invention.
Figure 2:
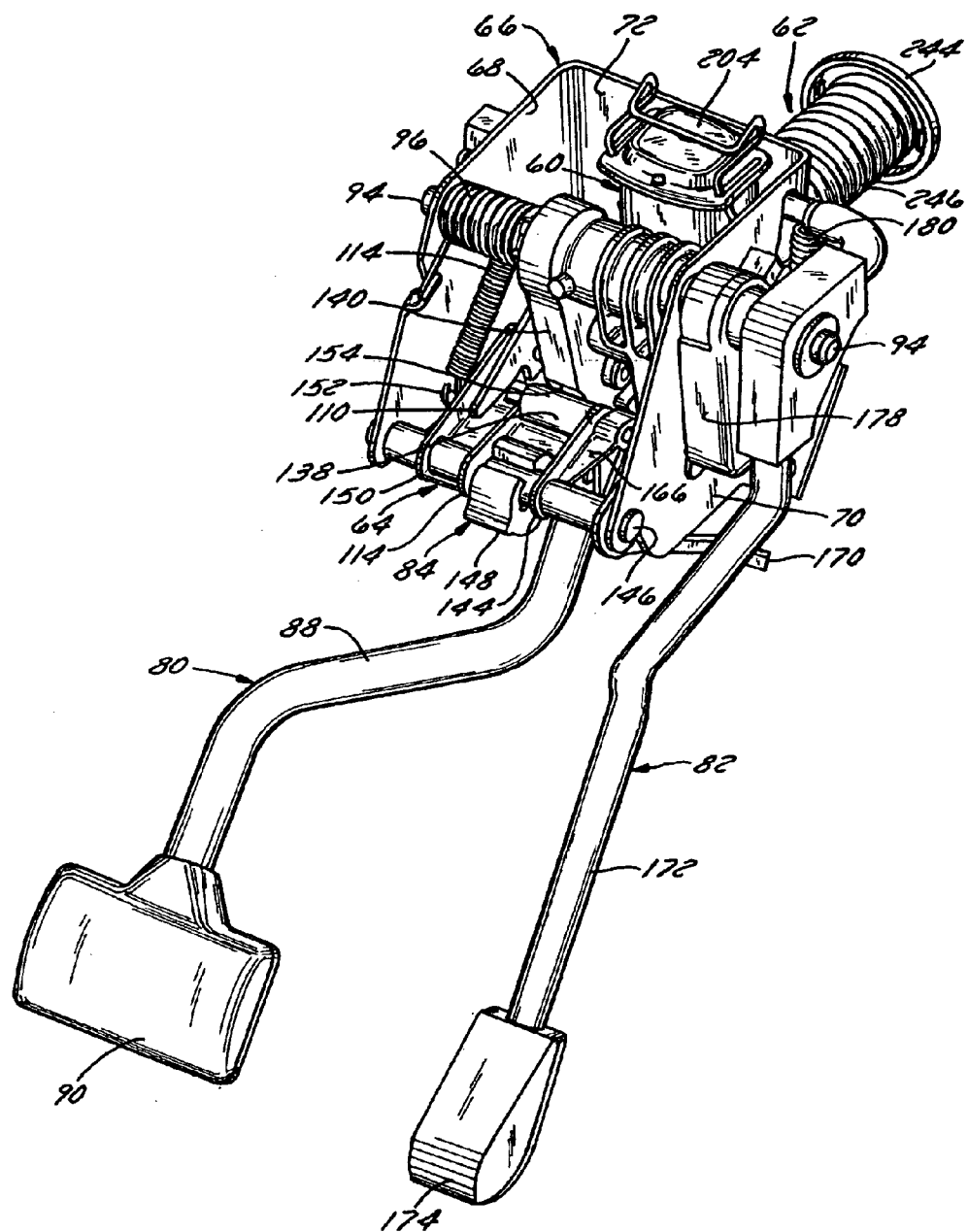
FIG. 2 is a perspective view of a brake actuator and release assembly of the brake system of FIG. 1.
Figure 3:
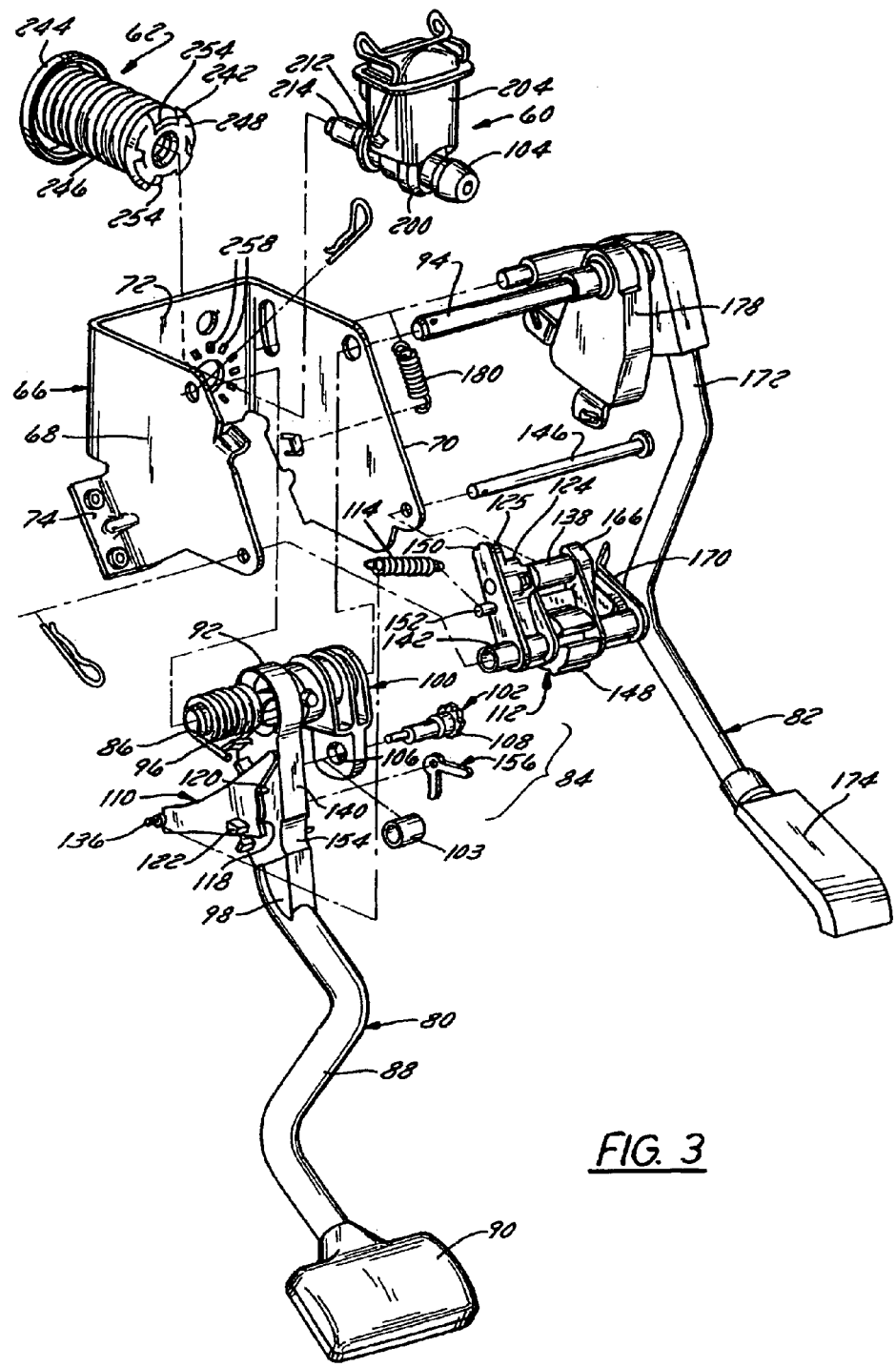
FIG. 3 is an exploded perspective view of the assembly of FIG. 2.
Figure 4:
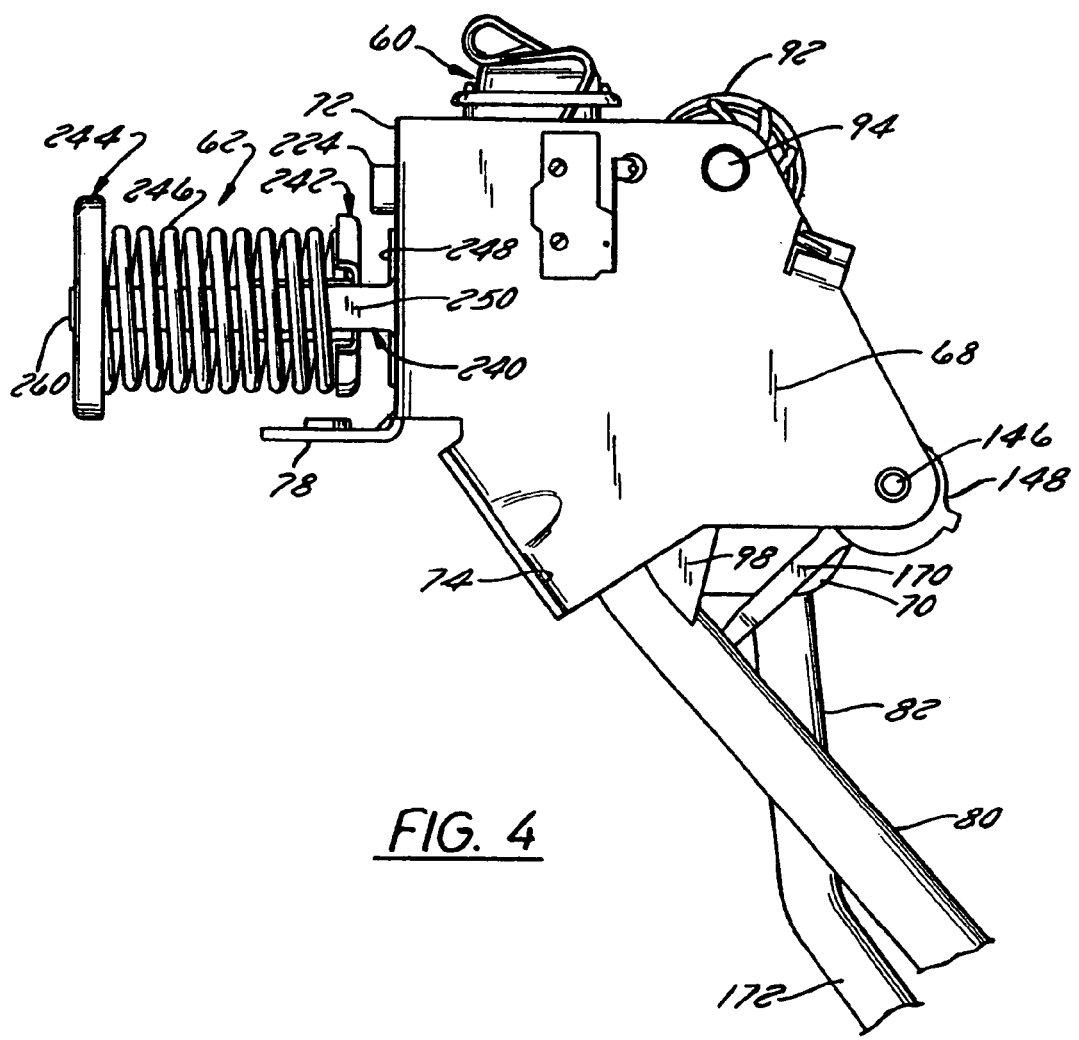
FIG. 4 is an outboard side-elevation view of the assembly of FIG. 2.
Figure 5:
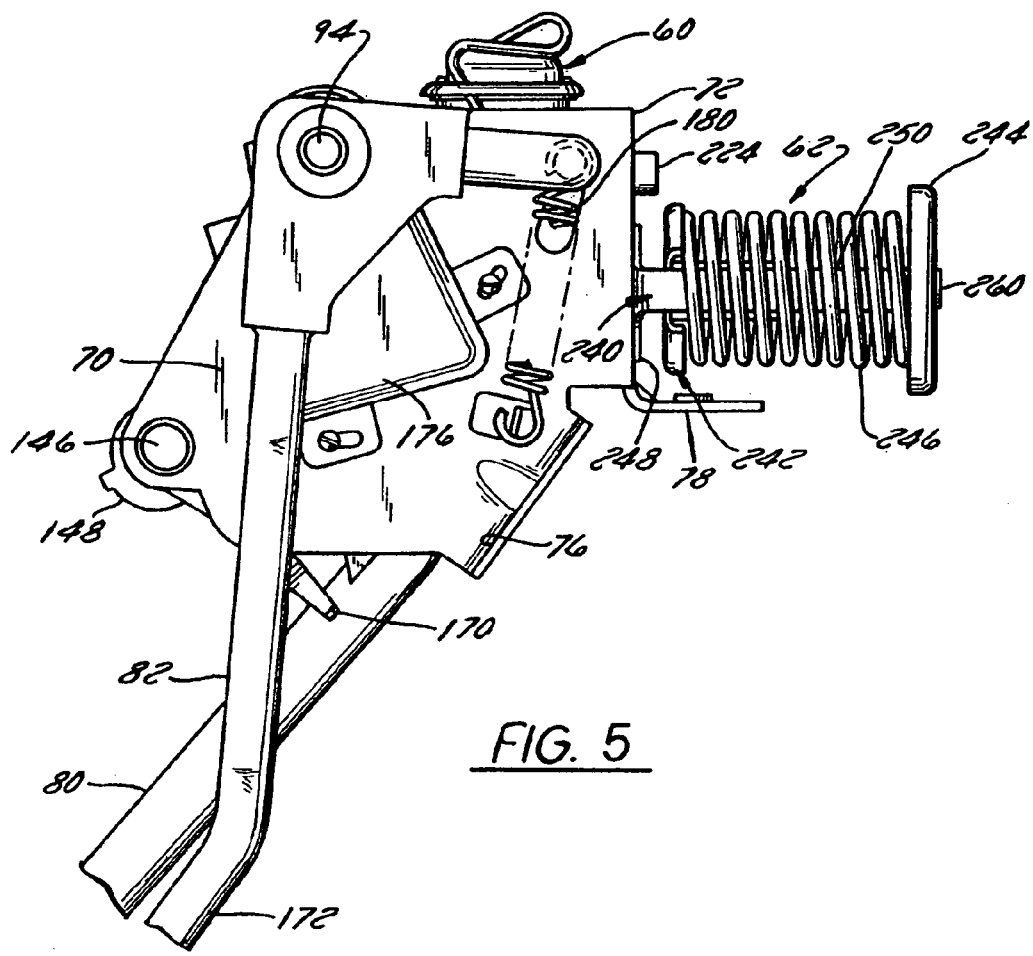
FIG. 5 is an inboard side-elevation view of the assembly of FIG. 2.

Referring now to FIG. 1, a golf car 30 to which the invention is applicable includes a vehicle chassis 32 supported on front and rear wheels 34 and 36 and supporting an operator's seat 38. A floorboard 40 extends forwardly from the operator's seat 38 and terminates at a sloped front wall 42 that extends upwardly to a location beneath a front cowling 44. At least the rear wheels 36 are braked by a hydraulic brake system 50 that is used both for service braking and for park and hold braking. This hydraulic brake system 50 exhibits many advantages over conventional systems having a separate mechanical parking brake and a hydraulic service brake. First, it eliminates the need for two separate brake pedals, thereby substantially reducing costs and facilitating operation. Second, unlike mechanical systems, hydraulic systems can be reliably self-adjusting. Third, because braking effectiveness generally is proportional to brake pad burnishing through dynamic usage, combining the park and hold brake with the service brake substantially improves parking braking efficiency and consistency. Fourth, less force is required to properly set and hold a hydraulic brake than a comparable cable actuated brake due to the lower system friction loss. As a result, system 50 requires less force for selecting either the service or parking modes verses a mechanical system which requires greater force to properly engage a service or parking mode. Fifth, It is possible to park and lock all braked wheels. Finally, the operator experiences a much more pleasant, controlled braking experience than is generally associated with a cable actuated mechanical brake.

Still referring to FIG. 1, major components of the brake system 50 include 1) a plurality of brakes 52 (one of which is associated with at least each of the rear wheels 36, and possibly other wheels as well), 2) a brake actuator and release assembly 54, and 3) brake lines 56 connecting the brake actuator and release assembly 54 to the brakes 52. The brakes 52 may comprise either drum brakes or disc brakes, so long as they are hydraulically actuated.

The brake actuator and release assembly 54 is configured to selectively generate hydraulic fluid pressure in the brake lines 56 to apply the brakes 52. The hydraulic brake fluid used for this purpose may comprise any fluid used in braking systems.

Figure 26:
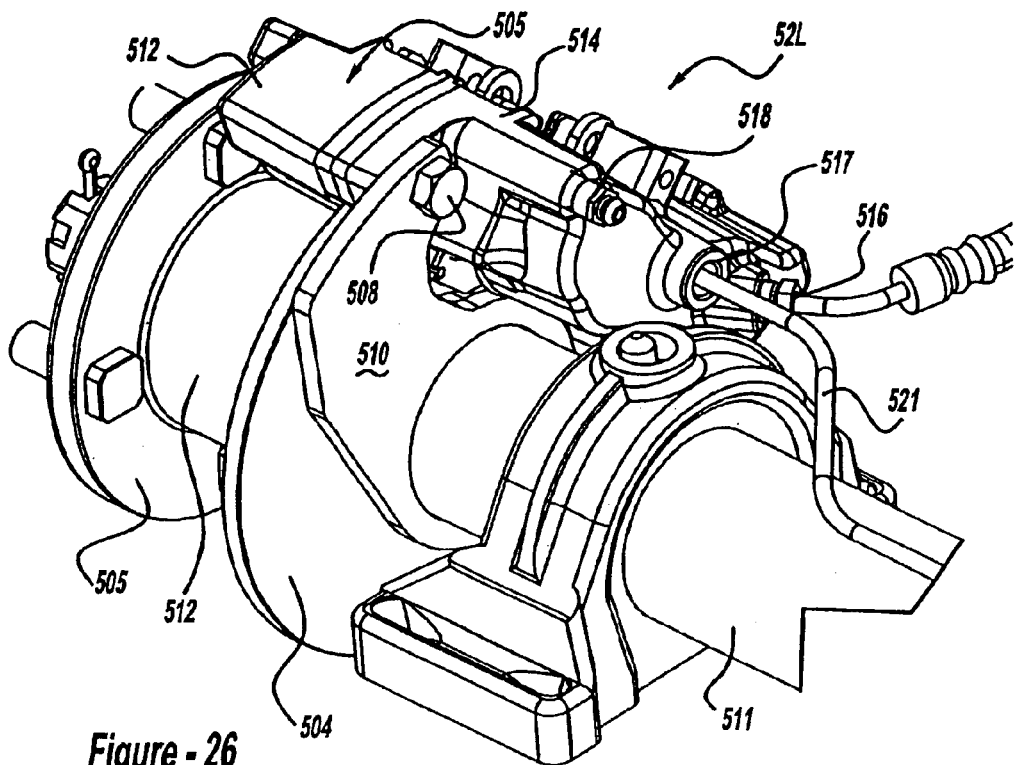
FIG. 26 is a perspective view of a left caliper and hub assembly usable with the vehicle and brake system of FIG. 1.

The brake system 50 is designed to not experience any leakage during the life of the system, even if the brakes 52 are locked in the engaged positions for prolonged periods at high pressures on the order of 750 psi or above. This pressurization exceeds internal hydraulic fluid pressure typically utilized in conventional hydraulic braking systems, particularly at rest. In order to ensure that such positive sealing is achieved in the face of the relatively high static hydraulic pressures present in the brake system 50 when the brakes 52 are engaged, elastomeric seals may be used in place of metal-to-metal contact on all sealing surfaces, including on the system's air bleeder valves. Hydraulic brake system 10 also provides a positively-sealed, pressurized hydraulic brake system. In a parking mode, hydraulic brake system 10 generates approximately 750 pounds per square inch (PSI). The system 50 is preferably filled by first pulling a vacuum on the entire braking system to check for leaks, and eliminate entrapped air, and thereafter filling the system with the brake fluid. This technique of pulling a vacuum on a brake system and then filling it has the benefit of purging air from the system, thus reducing the possibility of a soft brake pedal. FIGS. 26–30 show a preferred embodiment of a caliper assembly of a representative brake 52 usable in the system 50 and its interconnection to the vehicle 30. FIG. 26 shows a left brake 52 which is composed of the integral hub and rotor assembly 502 which has a rotor portion 504 and a wheel hub portion 505. Brake 52 further has a caliper assembly 506 which is attached by two through bolts 508 to affixed flange 510 rigidly mounted to the rear axle housing 511.

Caliper assembly 506 has a caliper outboard half subassembly 512 and a caliper inboard half subassembly 514. Caliper inboard half 514 has an input fluid port 516 for receiving fluid from the hydraulic brake line 521 and a fluid output port 517 for providing fluid to the right brake 52R (see FIG. 27). Caliper inboard half subassembly 514 has a bleeder valve 518 for bleeding air from the brake lines 521 during repair or installation.

Figure 27:
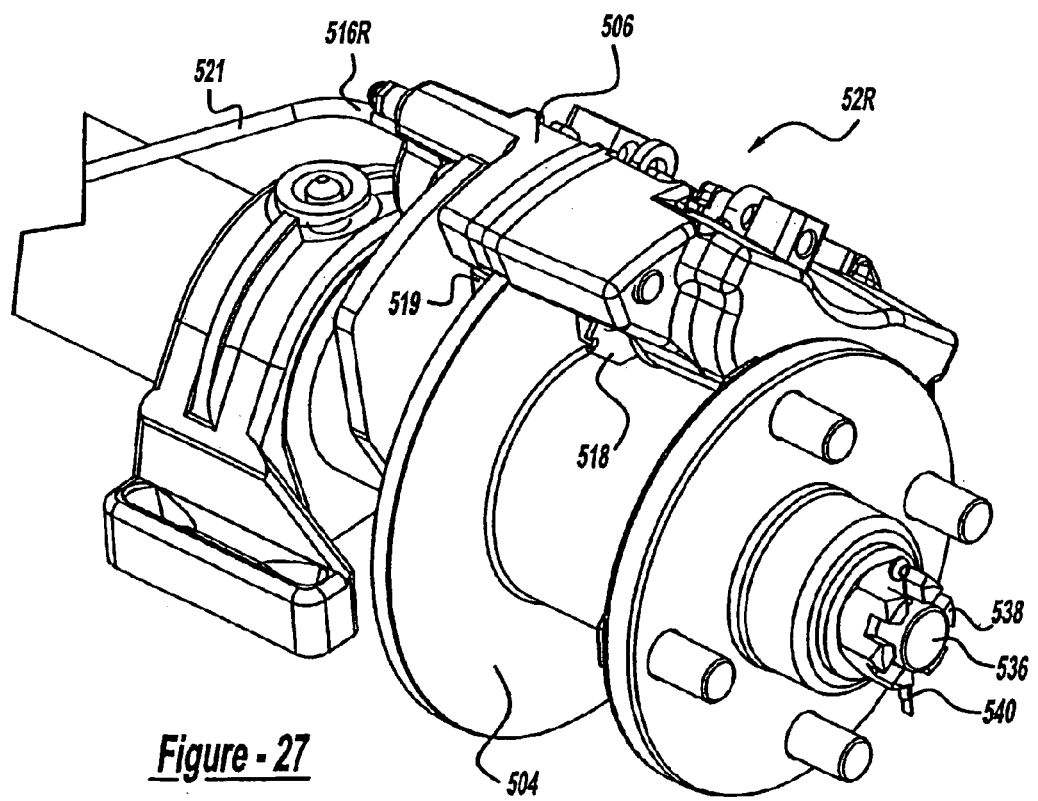
FIG. 27 is a perspective view of a right caliper and hub assembly usable with the vehicle and brake system of FIG. 1.

FIG. 27 shows a right brake 52R, which is composed of the same components as those shown in the left brake assembly 52L of FIG. 26, in mirror image form. Caliper assembly 506 holds a pair of brake pads 518 and 519 adjacent to rotor 504 of the integrated hub and rotor assembly 502. Pads 518 and 519 move in response to hydraulic force generated by fluid under pressure applied to input port 516R. The integrated hub and rotor assembly 502 is held onto drive shaft 536 by a hex castle nut 538 and cotter pin 540.

Figure 28:
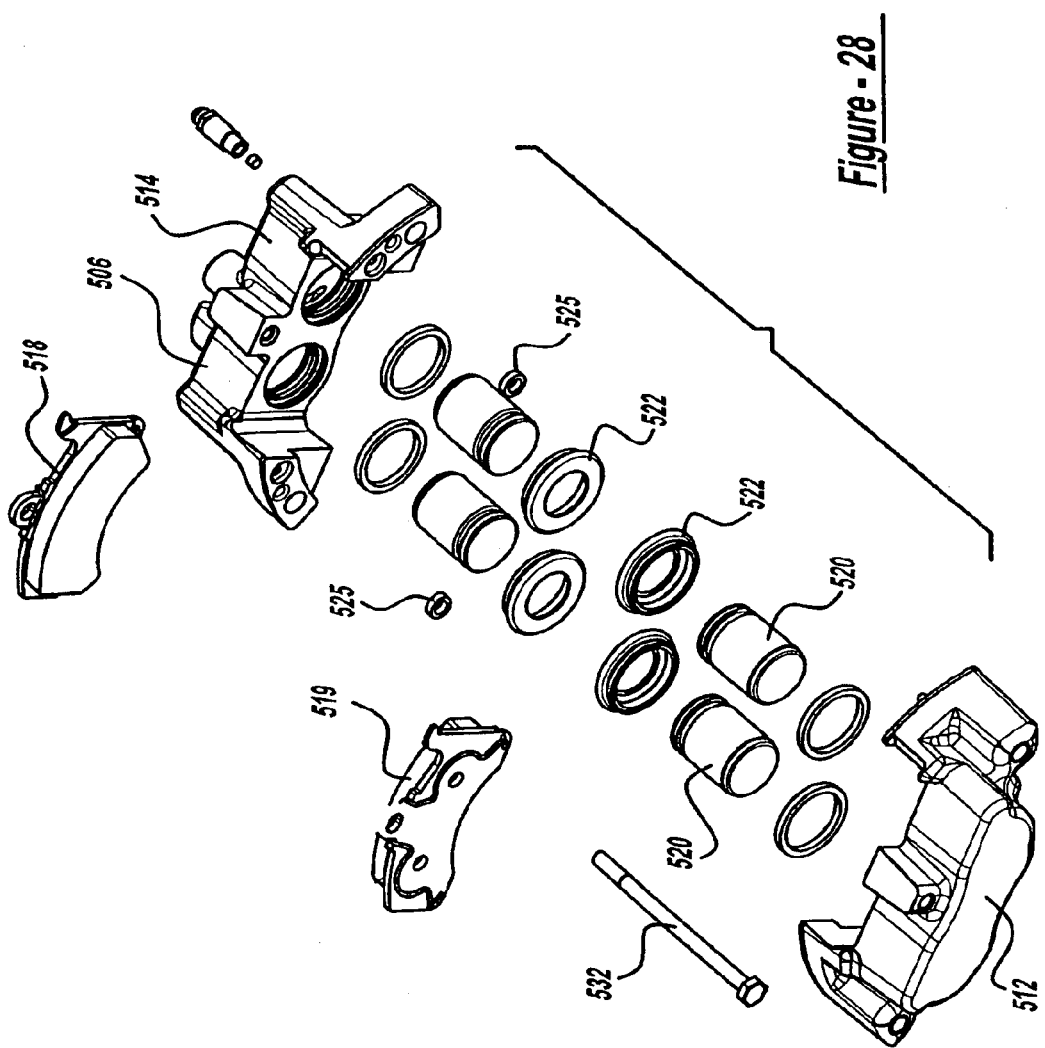
FIG. 28 is an exploded perspective view of the caliper of the assembly of FIG. 26.

FIG. 28 shows an exploded view of caliper assembly 506, which reveals that the caliper inboard half subassembly 514 and caliper outboard half subassembly 512 each have a pair of piston actuators 520. Each actuator has a conventional polymeric outside seal 522, which elastically deforms when the pistons are moved forwardly to press against the brake pads 518 and 519, and which undeform to pull the piston away from the rotor portion 504 when the fluid pressure is removed. Between the halves of the caliper 506 is a pair of conventional elastomeric 0-rings 525 which function to help prevent leakage of hydraulic fluid moving through internal passages within each half sub assembly 512 and 514 and between the halves of the caliper 506. Disposed immediately adjacent the 0-rings 225 is a pair of through holes 528 for accepting through mounting bolts 530 (not shown in FIG. 28). Also shown is through bolt 532 which functions to secure brake pads 519 and 518 in their proper alignment with the rotor portion 504. Wire spring clips 542 and 544 generally are further provided to hold the brake pads in place.

Figure 29:
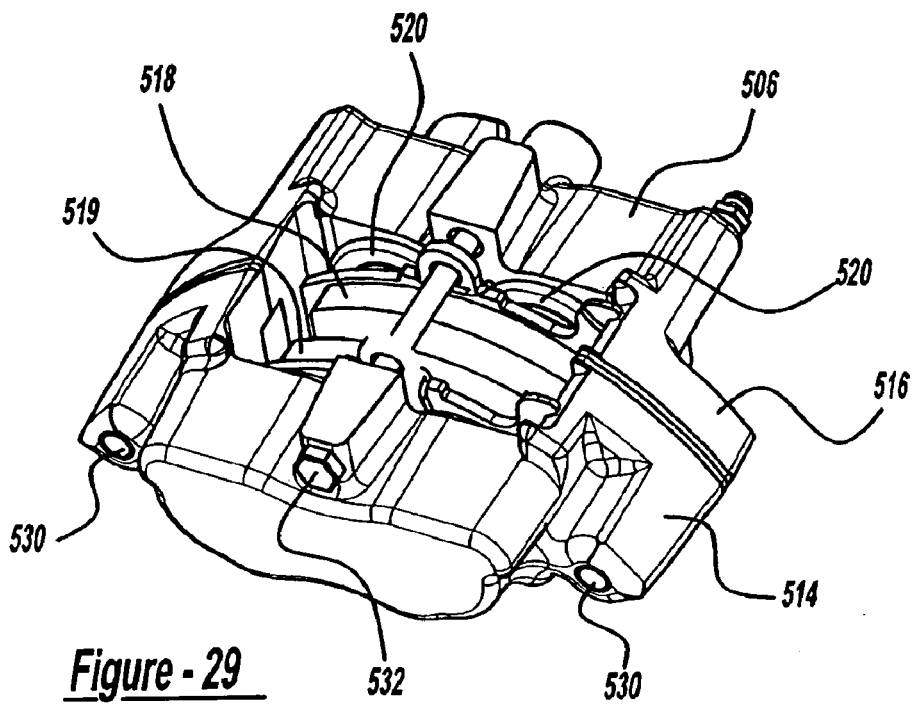
FIG. 29 is a perspective view of the caliper of FIG. 28.

FIG. 29 is a perspective view of caliper assembly 506 of the current invention. Shown are the through bolts 530 which function to hold the caliper inboard half subassembly 514 and caliper outboard half subassembly 516 together. Also shown are through bolts 532 holding the brake pads 518 and 519 in proper position between the piston actuators 520.

Figure 30:
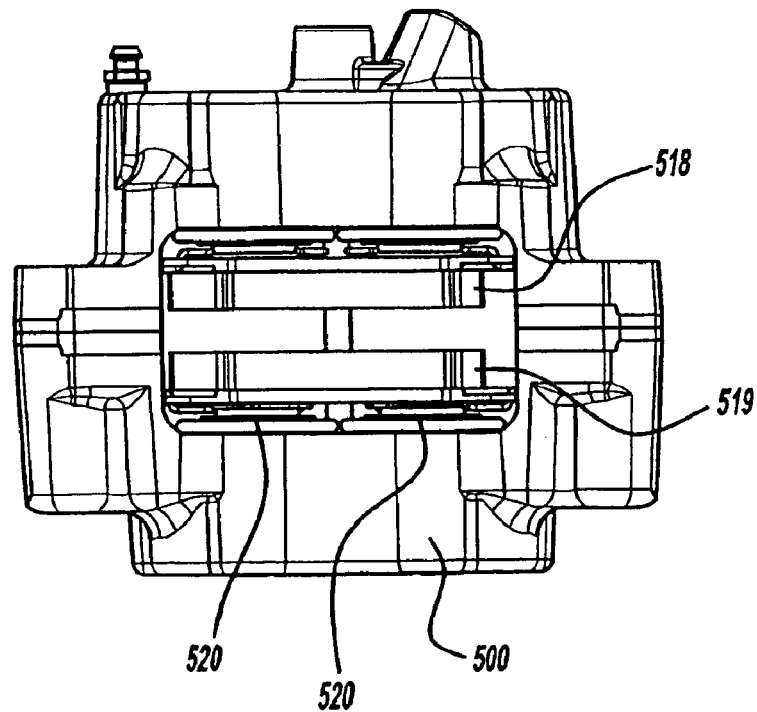
FIG. 30 is a bottom plan view of the caliper of FIG. 29.

FIG. 30 shows a bottom view of the caliper brake assembly 500. Shown is the relationship of the pads 518 and 519 with the actuating pistons 520. As can be seen, the pads 518 and 519 define a space wherein the rotor portion 504 is located.

Figure 31:
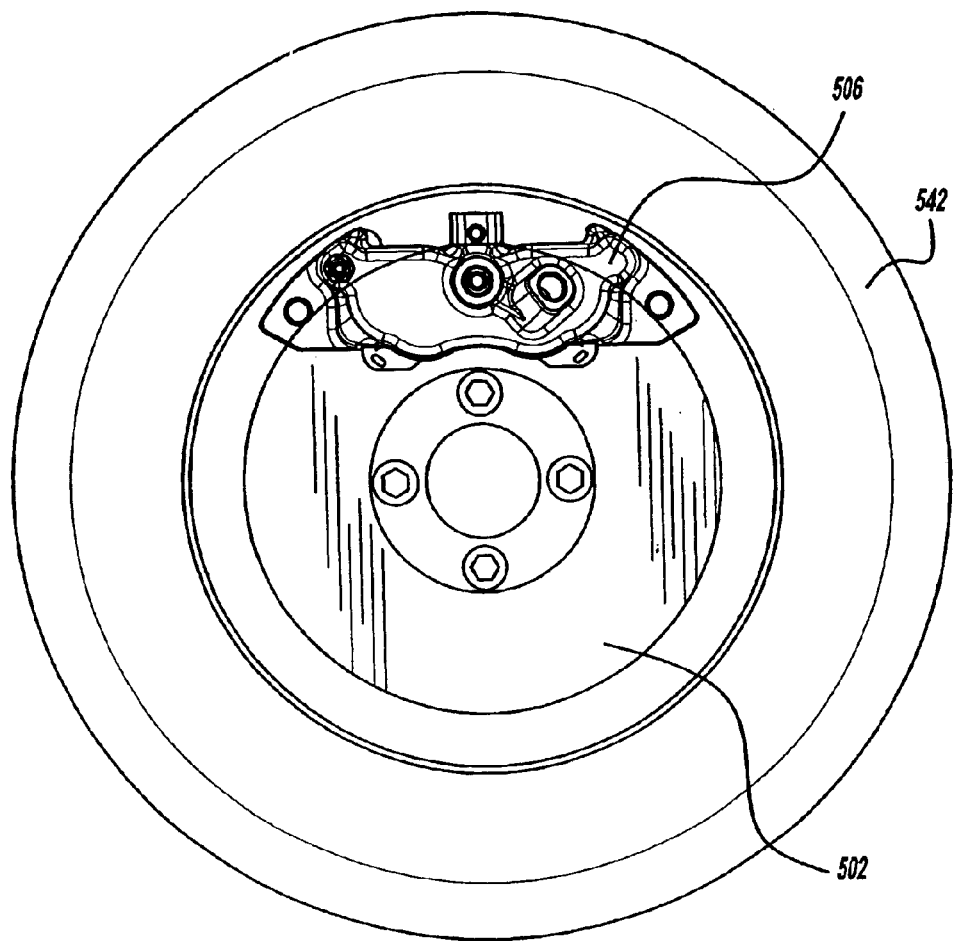
FIG. 31 is a side elevation view of an integral wheel hub and rotor assembly employing caliper and hub assembly of FIG. 26.

FIG. 31 is a diagram of the integral wheel hub and rotor assembly with caliper disposed within the small diameter of the golf cart wheel 542. As can be seen, the low profile caliper 506 can fit within the small diameter of the golf cart wheel. The lower profile of the caliper 506 allows for incorporation of a disk brake system onto a golf car or the like.

Still referring to FIG. 1, the entire brake actuator and release assembly 54 is configured as a modular unit mounted above the floorboard 40 and at least partially beneath the front cowling 44. It therefore lacks any underhanging components that extend beneath the floorboard 40. This configuration is advantageous for several reasons. For instance, there is no risk that any components of the brake system 50 will be damaged by obstructions over which the vehicle 30 may travel. Moreover, the system's components are isolated from corrosive substances over which the vehicle may travel such as water, fertilizers, etc.

Referring now to FIGS. 1–6, the brake actuator and release assembly 54 includes as its major components 1) a master cylinder 60, 2) a hydraulic accumulator 62, and 3) an integrated brake pedal and accelerator pedal assembly 64. All of these components are mounted on a common master cylinder housing 66 that is formed from a single metal stamping. As best seen in FIGS. 2–6, the housing 66 has an open rear end, inboard and outboard sidewalls 68 and 70, and a front wall 72 connecting the sidewalls 68 and 70 to one another. Mounting flanges 74, 76, and 78 extend outwardly from the sidewalls 68 and 70 and the front wall 72 for connection to a support such as the front wall 42 of the operator's compartment.

The integrated brake pedal and accelerator pedal assembly 64 and the hydraulic accumulator 62 can be used either in combination or independently of one another and are applicable to the illustrated brake system 50 as well as to a variety of other systems. Each of these components will be described in turn.

3. Integrated Brake Pedal and Accelerator Pedal Assembly
  a. Construction of Integrated Brake Pedal and Accelerator Pedal Assembly The integrated brake pedal and accelerator pedal assembly 64 is usable with the hydraulic brake system 50 as well as a more traditional mechanical cable-actuated brake system. It includes a brake pedal 80, an accelerator pedal 82, and a locking mechanism 84. The assembly 64 can perform several distinct functions. First, the brake pedal 80 can be actuated to perform a service braking operation. Second, the locking mechanism 84 can latch the brake pedal 80 in a locked, actuated position to hold the service brakes 52 in their engaged position. Third, the brake pedal 80 can operate, in conjunction with the accumulator 62, to facilitate brake pedal latching and store energy to help assure that the brakes 52 will remain in their locked position despite creep that may occur within the system. Fourth, the locking mechanism 84 can be released using either the brake pedal 80 or the accelerator pedal 82 without actuating any secondary brake release mechanism.

Figure 6:
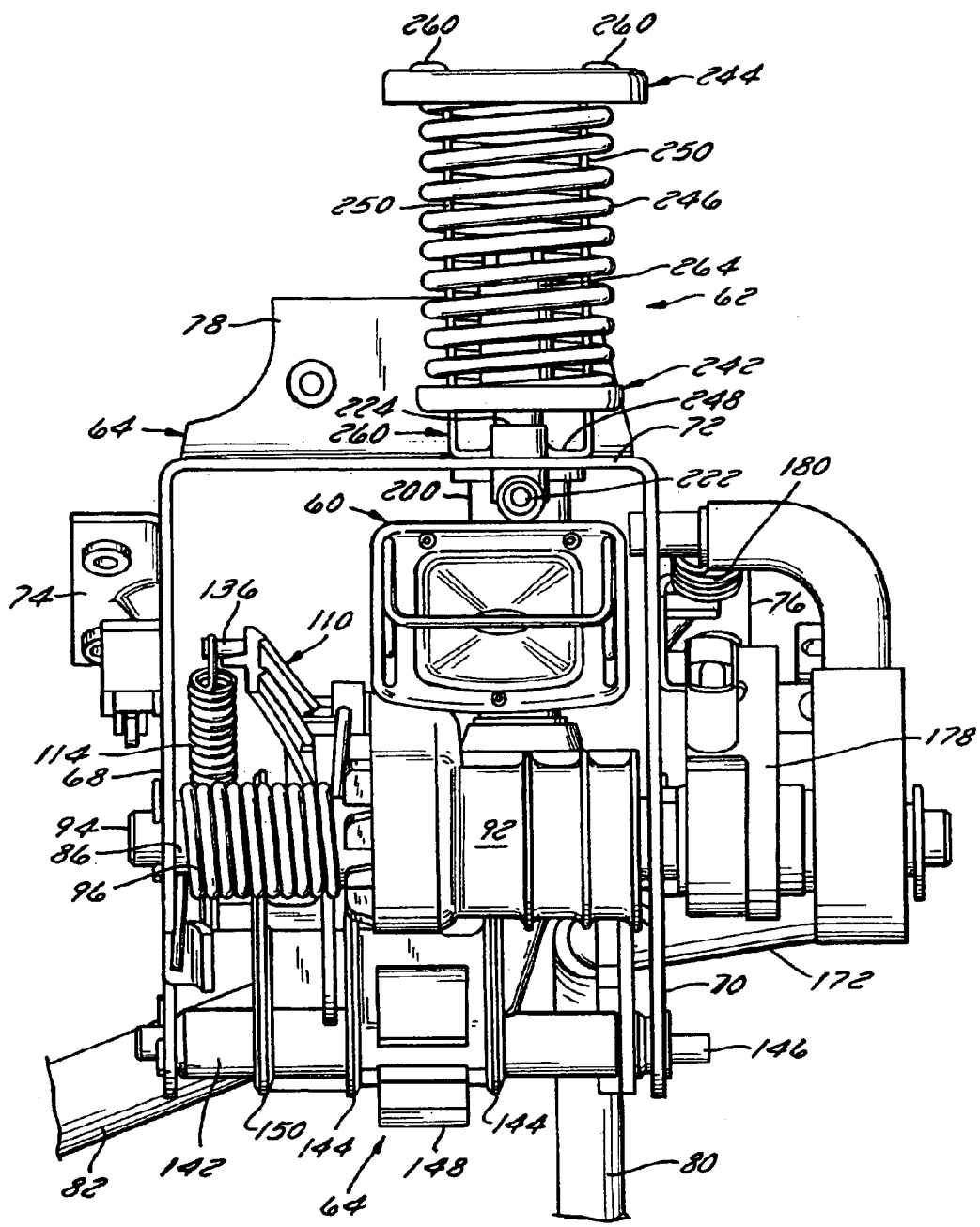
FIG. 6 is a top plan view of the assembly of FIG. 2.
Figure 15:
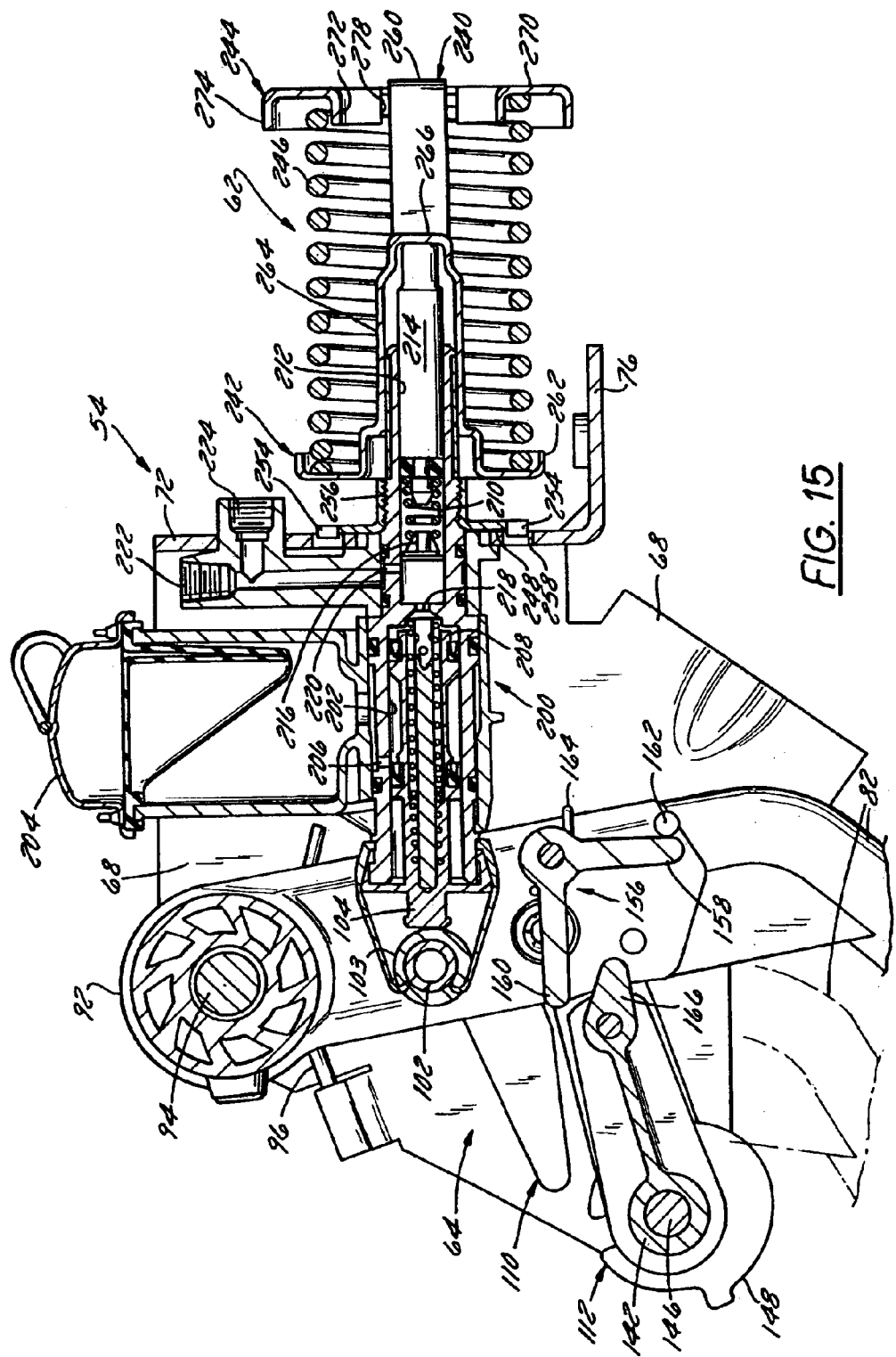
FIG. 15 is a sectional side-elevation view showing the assembly of FIG. 2 in a position in which an accumulator thereof is energized.
Figure 16:
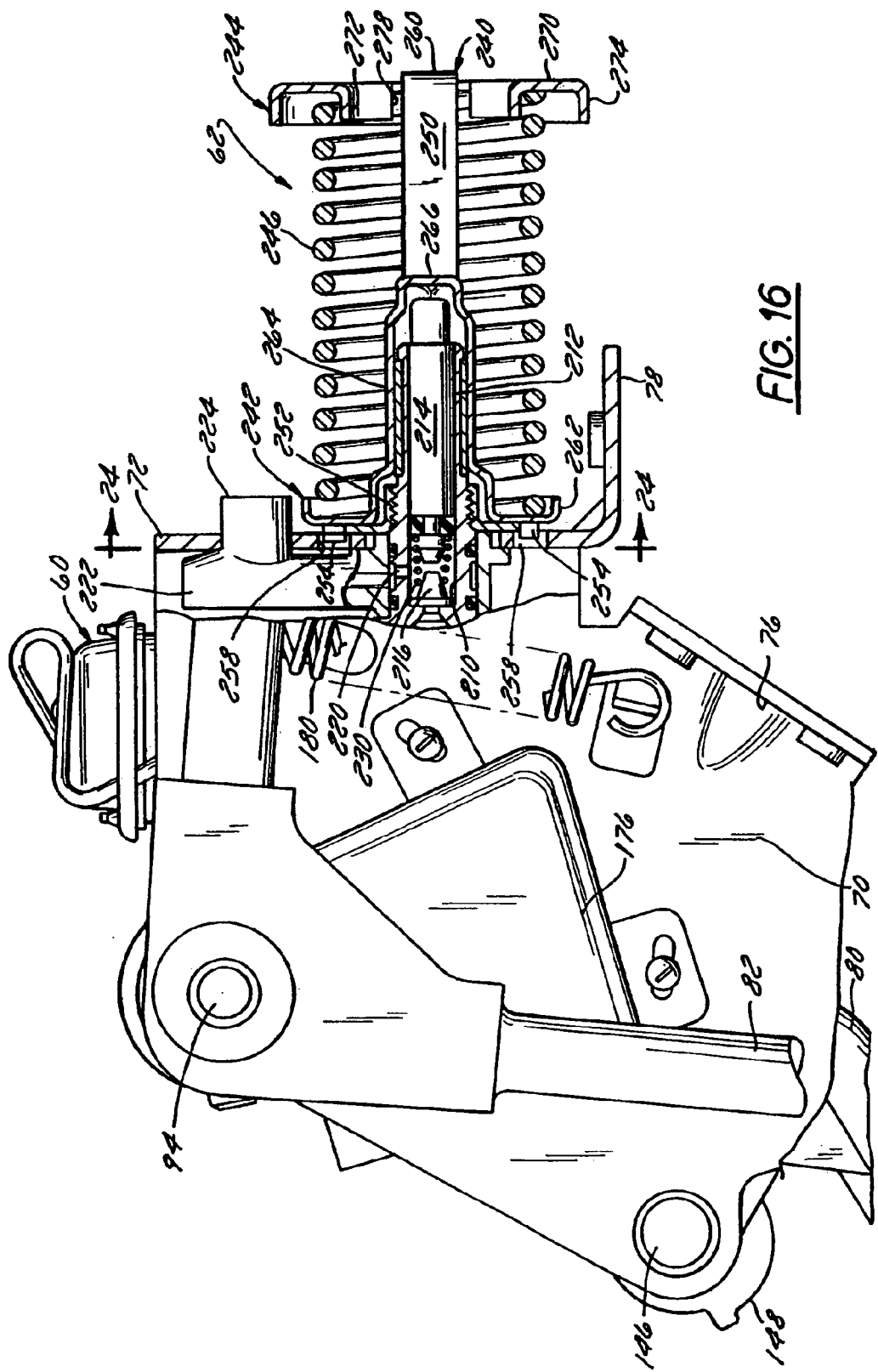
FIG. 16 is fragmentary sectional side view generally corresponding to FIG. 15 and illustrating the accumulator in its de-energized position.

The brake pedal 80 includes a pivot shaft 86, a lever arm 88 extending downwardly from the pivot shaft 86, and a pad 90 mounted on the bottom end of the lever arm 88. As best seen in FIGS. 6, 15, and 16, the pivot shaft 86 is mounted on a plastic sleeve 92 so as to be rotatable with respect thereto, and the plastic sleeve 92 is, in turn, mounted on a main pivot shaft 94. Shaft 94 is rotatably supported on the support bracket 66 and also serves as the pivot shaft for the accelerator pedal 82 (discussed below). The pivot shaft 86 is lubricated via a synthetic damping grease injected into the space between the pivot shaft 86 and the plastic sleeve 92. The damping grease preferably that comprises one that exhibits good lubrication characteristics at low rotational velocities but that actually serves to damp or inhibit shaft rotation at higher rotational velocities. The preferred grease is NYE PG-44A, which is manufactured by Nye Lubricants, Inc. of New Bedford, Mass. This grease is an extremely stiff consistency, inorganically gelled, water resistant, rust-inhibited damping grease based on a high molecular weight polymeric-base oil. The lever arm 88 preferably is formed from steel encased in a plastic sleeve (not shown) in order to protect the steel from corrosion. The pad 90 may comprise any suitable foot actuated pad mounted on the end of the lever arm 88. A torsion spring 96, serving as a brake pedal return spring, is mounted on the pivot shaft 86 on one side of the lever arm 88. In addition, a plastic block 98 is mounted on the upper surface of the lever arm 88 to form part of the lock mechanism 84 as detailed below.

Referring particularly to FIGS. 3 and 12–16, a master cylinder actuating pin support arm 100 is mounted on the pivot shaft 86 adjacent the inboard side of the lever arm 88 so as to rotate with the lever arm 88. An actuating pin 102 is mounted on the support arm 100 so as to rotate with the pivot shaft 86. The pin 102 is coupled to a main piston 104 of the master cylinder 60 (detailed in Section 4 below) via a roller 103 and a strap 105 so that the brake pedal 80 and master cylinder piston 104 always move together as illustrated in FIG. 15. The actuating pin 102 comprises an eccentric pin that is mounted in an aperture 106 in the support arm 100 so as to extend laterally toward the brake lever arm 88. A head 108 on the pin 102 can be rotated to rotate the thicker portion of the eccentric pin 102 either towards or away from the master cylinder main piston 104, thereby eliminating any play or dead space between the brake pedal 80 and the master cylinder main piston 104 after assembly of all components.

The locking mechanism 84 is operable to automatically latch the brake pedal 80 in its locked position upon depression of the brake pedal 80 to a latch point and to automatically unlatch the brake pedal 80 from its locked position to release the brakes 52 upon brake pedal overtravel beyond the latch point. The locking mechanism 84 also is configured to release the brake pedal 80 under power of the accelerator pedal 82. The locking mechanism 84 may comprise any structure having at least one of 1) single point latching capability, 2) the ability to release the brakes 52 upon brake pedal overtravel beyond its latched position, and 3) a kickoff mechanism that permits accelerator pedal release of the brake pedal 80. The illustrated locking mechanism 84 includes the block 98 on the brake pedal lever arm 88, a control arm 110 pivotally mounted on the brake pedal 80, a swing arm 112 pivotally mounted on the support bracket 66, and an over-center spring 114 that is coupled to the control arm 110 and to the swing arm 112 so as to bias the swing arm 112 downwardly during service braking and to bias the swing arm 112 upwardly during a latch and release cycle.

Figure 7:
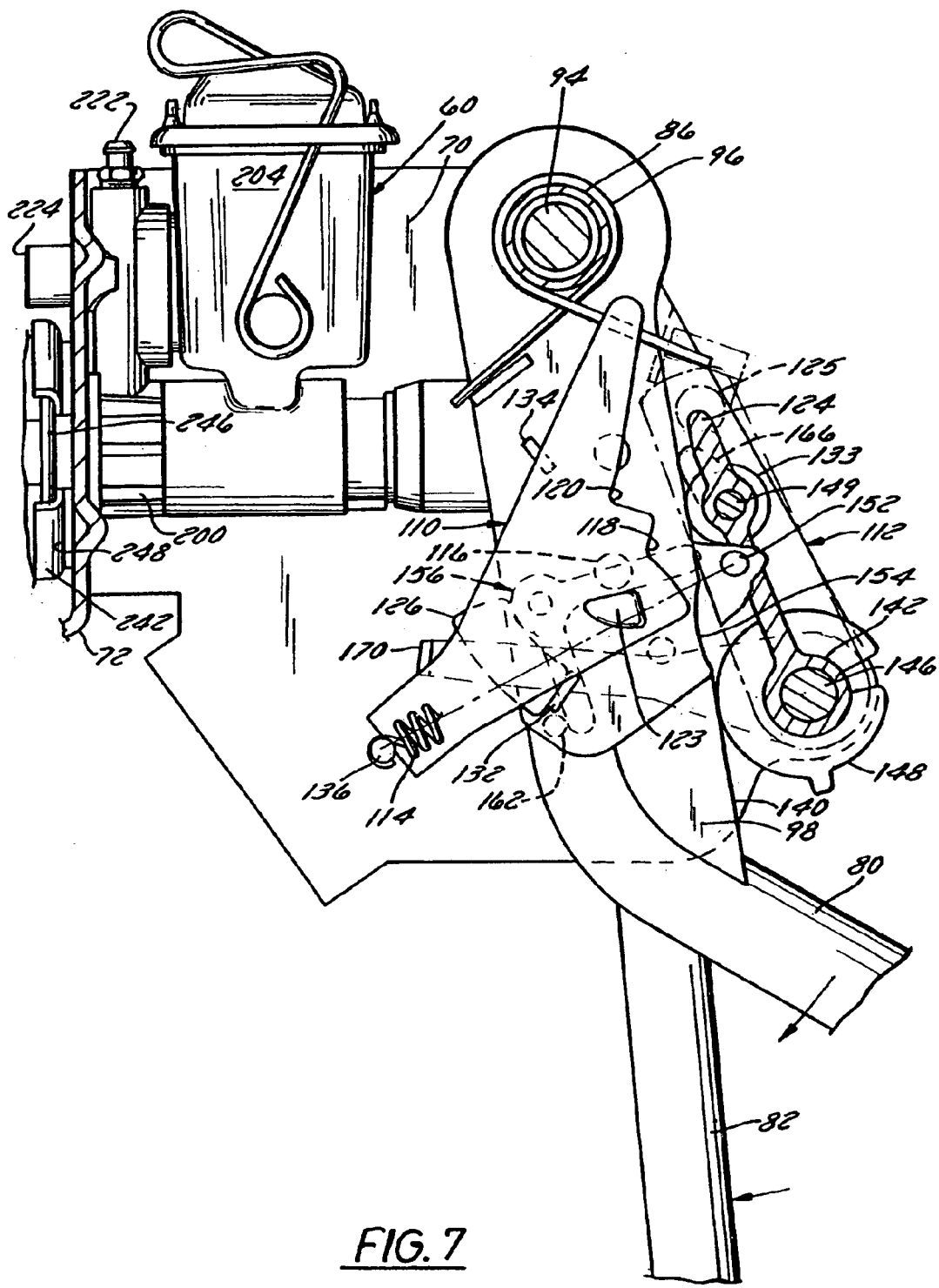
FIGS. 7–11 are outboard side-elevation views of a portion of an integrated brake pedal and accelerator pedal subassembly of the assembly of FIG. 2, illustrating a sequence of a braking operation including service braking, brake pedal latching, and brake pedal release.
Figure 8:
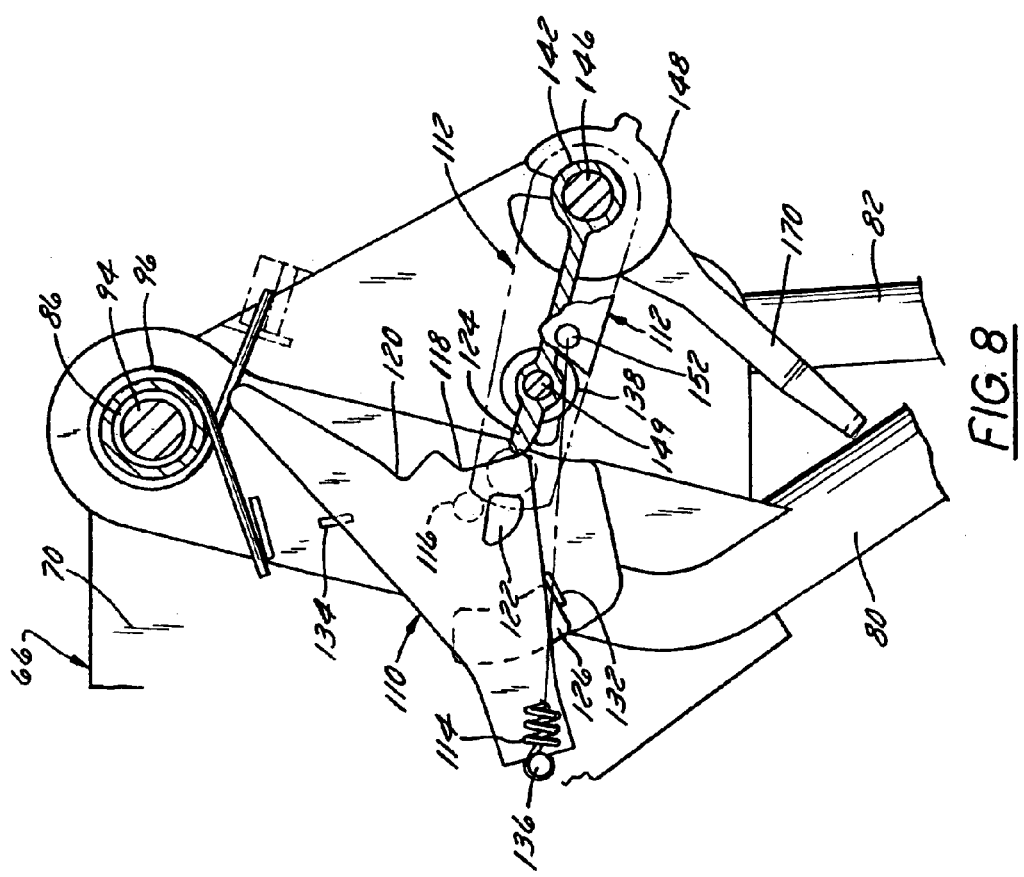
Figure 9:
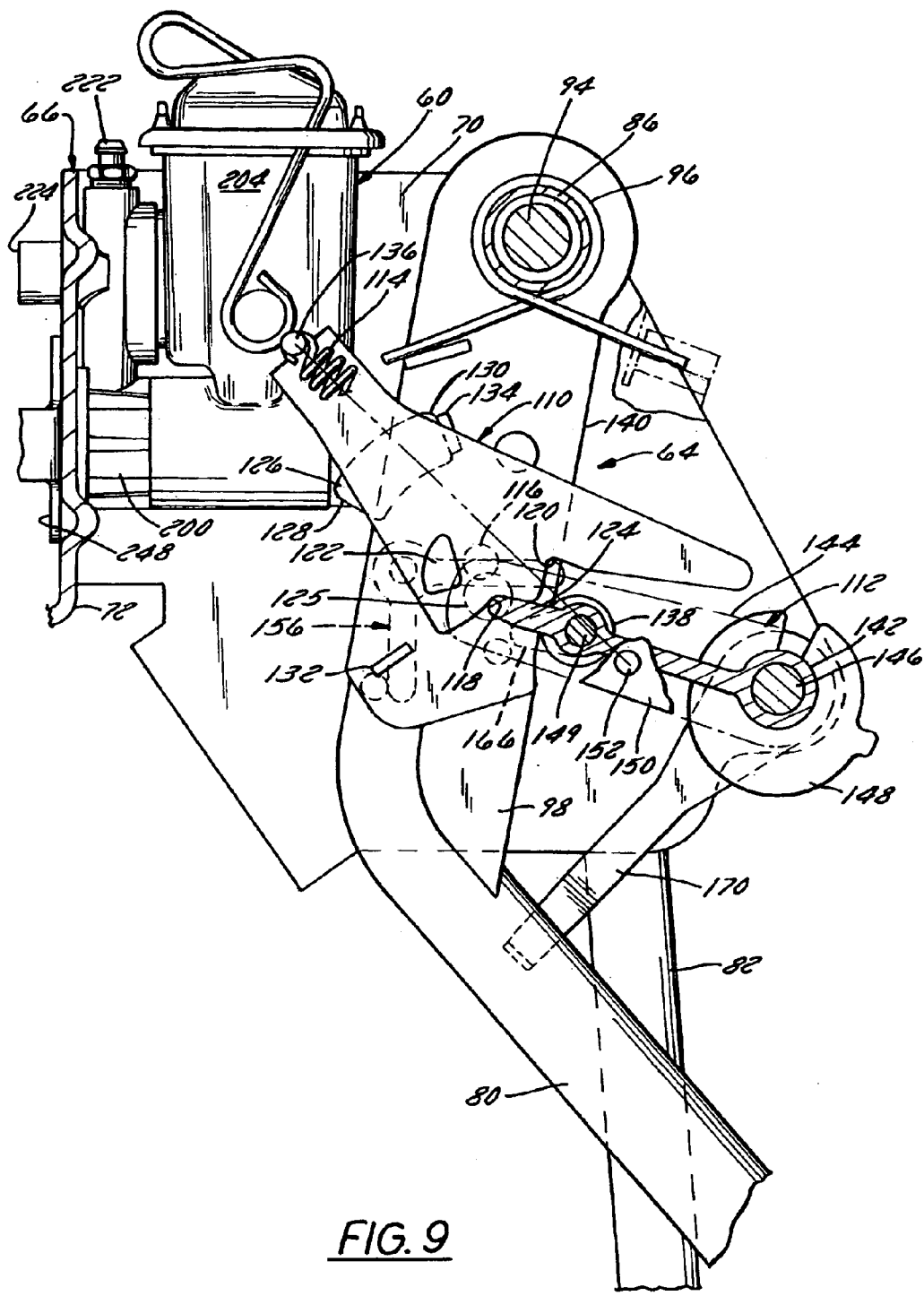
Figure 11:
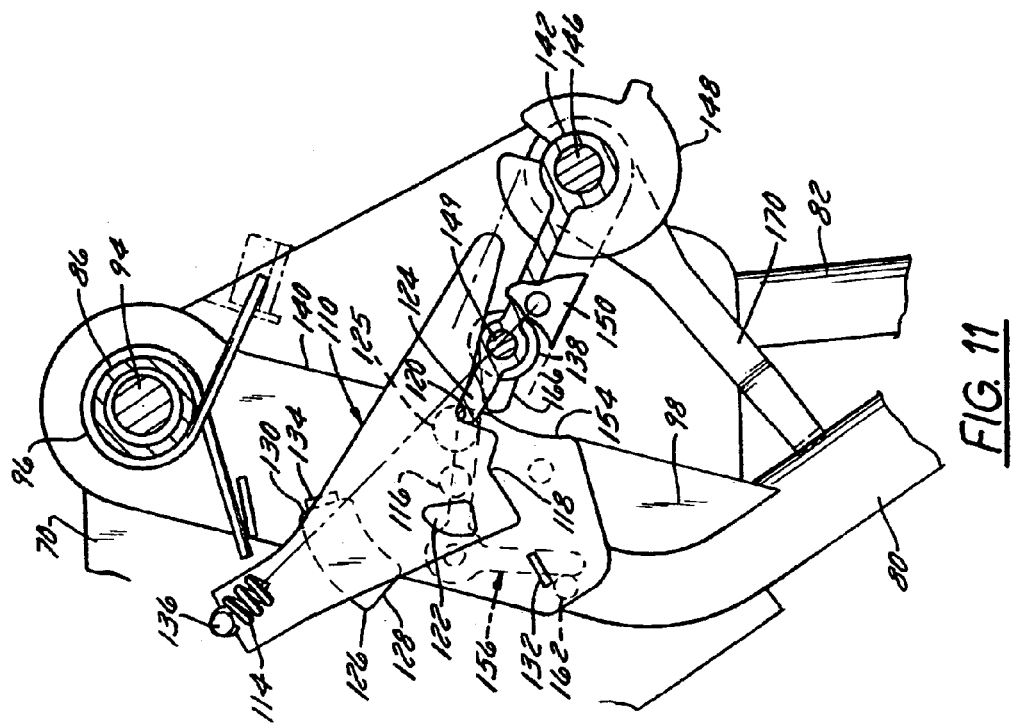

The control arm 110 comprises a metal plate pivotally mounted on the block 98 of the brake pedal 80 via a pivot pin 116, best seen in phantom in FIGS. 7–9. Control arm 110 has inner and outer faces and front and rear ends. The rear end presents detents 118 and 120, and a lug 122 is mounted on the outer face near the rear end near the axis of the pivot pin 116. During a brake lock and release cycle as detailed in Section 3b below, detents 118 and 120 cooperate with a dog or pawl 124 on the swing arm 112. A cushioned stop 126 is mounted on the inner face of the control arm 110 in front of the pivot pin 116. The stop 126 has first and second arcuate surfaces 128 and 130 that selectively engage corresponding first and second cushioned posts 132 and 134 on the block 90 during the brake pedal lock and release cycle as detailed below. Finally, a post 136 extends outwardly from a front end portion of the outer face of the control arm 110 for connection to a front end of the over-center spring 114.

The swing arm 112 supports the dog 124 and the cam 125. It also supports a cam follower 138 that rides along a cam 140 on the block 98. The entire swing arm 112 is mounted on a pivot tube 142 that extends laterally across the support bracket 66 and that is rotatably supported on a support pin 146. Support pin 146 is, in turn, mounted in apertures in the opposed sidewalls 68 and 70 of the support bracket 66. A pair of cam follower support arms 144 extend forwardly from the pivot tube 142 in a spaced-apart relationship. The cam follower 138 is rotatably mounted on the front ends of the support arms 144, and a cushioned elastomeric bumper 148 is mounted on the rear ends of the support arms 144. The cam follower 138 comprises a roller mounted on the support arms 144 by a roll pin 149. The bumper 148 serves as a stop for the brake pedal 80 when the brake pedal is in its at rest or fully released position seen in FIG. 7. The dog 124 is positioned laterally outwardly of the outboard cam follower support arm 144 and is configured to cooperate with the detents 118 and 120 on the control arm 110 as best seen in FIGS. 7–11 and as detailed below. The cam 125 is formed from a common stepped lug with the dog 124 and is positioned so as to be engaged by the lug 122 on the control arm 110 during a latching operation. A spring support bracket 150, disposed outboard of the dog 124, supports a post 152 to which the over-center spring 114 is connected. The locations of the posts 152 and 136 on the swing arm 112 and the control arm 110 are selected relative to 1) one another, 2) the rotational axis of the cam follower, 3) the pivot axis of the brake pedal 80, and 4) the pivot axis of the swing arm 112 to cause the spring 114 to move across the pivot axis of the swing arm 112 at selected phases of the brake pedal depression and return processes so as to selectively assist brake pedal locking and unlocking. In the illustrated embodiment, the over-center spring is 30°–40° below the horizontal when it is in its first over-center position of FIGS. 7 and 8 and a corresponding amount above the horizontal when it is in the second over-center position illustrated in FIG. 9.

The block 98 is mounted directly on the upper surface of the brake pedal lever arm 88 and serves as a support structure for several other components of the locking mechanism 84. It has the cam 140 formed directly on the upper or rear surface thereof. The cam 140 is straight along the majority of its length but has an arcuate portion 154 at its lower end surface formed from a cutout in the block 98. Arcuate portion is dimensioned such that the cam follower 138 will rest in the arcuate portion 154 in a locked position of the brake pedal 80, seen in FIG. 9.

A generally L-shaped toggle arm 156 is pivotally mounted on the inner lateral surface of the block 98 adjacent the swing arm 112 as best seen in FIGS. 12–14. The toggle arm 156 includes 1) a first leg 158 and 2) a second leg 160 that extends generally orthogonally from the first leg 158. The first leg 158 is biased into contact with a post 162 on the block 98 by a return spring 164. The second leg 160 cooperates selectively with a lug 166 on the swing arm 112 so as to prevent swing arm pivoting motion during the initial phase of brake pedal depression and to subsequently permit the swing arm 112 to fall into its locking position when the lug 166 clears the second leg 160, thus allowing only one contact sound to be heard.

Finally, a kickoff arm 170 is mounted on the inboard end of the pivot tube 142 at a location beyond the inboard cam follower support arm 144. The kickoff arm 170 extends forwardly and outwardly from the pivot tube 142 so as to extend beyond the inboard sidewall 70 of the support bracket 66 and so as to be engaged by the accelerator pedal 82 upon initial accelerator pedal depression.

The accelerator pedal 82 is mounted on the inner distal end of the pivot shaft 94 at a location outside of the inboard sidewall 70 of the support bracket 66. It includes 1) a lever arm 172 that extends downwardly from the pivot shaft 94 and 2) a pad 174 that is mounted on the distal end of the lever arm 172. A portion of the lever arm 172 is positioned closely adjacent the kickoff arm 170 so as to engage the kickoff arm 170 upon initial accelerator pedal depression. In addition, a non-contact accelerator pedal position sensor 178 is positioned inside the lever arm 172 in order to provide an indication of accelerator pedal actuation. The accelerator pedal 82 is biased to its deactuated position by a return spring 180.

b. Operation of Integrated Brake Pedal and Accelerator Pedal Assembly

In operation, the integrated brake pedal and accelerator pedal assembly 54 assumes the position illustrated in FIGS. 4–7 when the brakes 52 are not engaged. At this time, the brake pedal 80 assumes an at rest or fully released position in which it is pivoted to its rearward-most extent in which the front face on the block 98 engages the bumper 148 on the swing arm 112. The cam roller 138 on the swing arm 112 is located at its maximum possible distance from the arcuate portion 154 of the cam 140. In addition, the over-center spring 114 is in its first over-center position in which it biases the control arm 110 to the position illustrated in FIGS. 5, 7, and 8 and in which its centerline is beneath the pivot axis of the swing arm 112. It therefore biases the swing arm 112 downwardly.

Next, the operator engages the brakes 52 by pressing downwardly on the pad 90 to swing the brake pedal 80 clockwise from the position shown in FIG. 7 into a service braking position shown in FIG. 13. This pivoting motion causes the master cylinder actuating pin 102 to drive the roller 103 and master cylinder main piston 104 forwardly to effect service braking. After the service braking stroke ends, but before the brake pedal 80 reaches it latch point, the lug 166 on the swing arm 112 rides along the second leg 160 of the toggle arm 156 to hold the cam roller 138 away from the cam face 140 and to hold the dog 124 and cam 125 on the swing arm 112 away from the control arm as seen in FIG. 13. As a result, service braking and subsequent brake pedal depression toward the latch point occur without contact between the latching components of the locking mechanism 84, thereby avoiding the generation of contact sounds that otherwise could give a false audible indication of pedal locking. The over-center spring 114 remains in its first over-center position at this time. The control arm 110 therefore remains in the position seen in FIGS. 7 and 8 in which it cannot latch against the swing arm 112. As a result, the brake pedal 80 will return to its released position if the operator removes his foot from the pad 90 without additional brake pedal depression.

At the end of service braking stroke and well beyond it, the lug 166 on the swing arm 112 clears the second leg 160 of the toggle arm 156 so that the swing arm 112 drops through an arc to a position in which the cam 125 engages the lug 122 on the control arm 110. This delayed dropping of the swing arm 112 has several benefits. For instance, as described above, it permits the dog 124 and cam 125 on the swing arm 112 to clear the detents 118 and 120 and the dog 122 on the control arm 110 so as to prevent a false audible indication of brake pedal locking. Moreover, it prevents the swing arm 112 from swinging towards its locked position until the over-center spring 114 is stretched sufficiently to store enough potential energy to effectively assist in swing arm movement into its locked position. In addition, the solid contact between the cam 125 and the lug 122 that occurs when the swing arm 112 drops into place produces a distinctive "clicking" sound that provides an audible indication to the operator that the brake pedal 80 has moved into a position in which it can be locked.

When the operator releases his foot from the brake pedal 80 after depressing it to its locked position, the brake pedal returns a very small amount to permit the over-center spring 114 to move from its first over-center position of FIGS. 7 and 8 to the second over-center position illustrated in FIG. 9 as a result of the swing arm cam 125 pushing the control arm dog 122. As a result of this movement, the control arm 110 pivots rapidly from the position illustrated in FIGS. 7 and 8 to the latched position illustrated in FIG. 9. Because the dog 122 is located very close to the pivot axis of the control arm 110, a very small range of axial brake pedal movement (on the order of a few thousands of an inch) results in 60° or more of control arm pivoting movement. This relationship reduces the work required of the over-center spring 114 during the latching process. The second face 130 on the stop 126 now engages the second post 134 on the block 98, and the first or lower detent 118 on the control arm 110 now engages the dog 124 on the swing arm 112 to lock the swing arm 112 in position. This motion provides a distinctive clicking sound that provides an audible indication to the operator that the brake pedal 80 has been locked. The brake pedal 80 will thereafter remain in the locked position of FIG. 9 under the latching force of the control arm 110 when the operator releases the brake pedal 80. However, because the spring 114 is now in is second over-center position in which its centerline is above the pivot axis of the control arm 112, it biases the control arm 112 upwardly rather than downwardly, thereby priming the control arm 112 for subsequent release.

The holding force applied on the control arm 110 by the over-center spring 114 at this time should be large enough so as not to be overcome by any force that might inadvertently be placed upon or generated through the accelerator pedal 82 by virtue of the vehicle 30 being jostled during shipment or by rough treatment by errant operators. However, this holding force need not be very large because any moment arm which might tend to cause the swing arm 112 to swing out of its locked position is very small. As a result, a relatively weak spring (having a spring load on the order of 8–12 lb can be used as the over-center spring 114.

Figure 10:
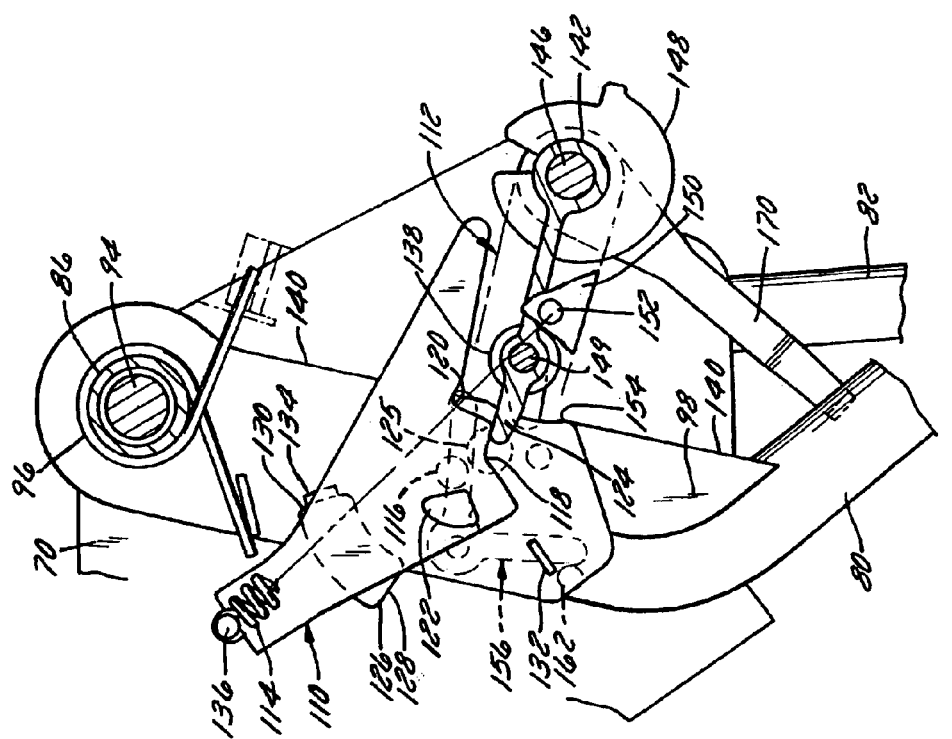

The brakes 52 may be released by operating either the brake pedal 80 or the accelerator pedal 82 to unlatch the brake pedal 80 from its locked position. To release the brakes using the brake pedal 80, all the operator need do is depress the pedal 80 beyond its locked position to an overtravel position. This brake pedal movement and consequent swing arm movement will cause the dog 124 on the swing arm 112 to slip out of the first detent 118 on the control arm 110, permitting the over-center spring 114 to pull the swing arm 112 upwardly so that dog 124 snaps against the second detent 120 as seen in FIG. 10. The snapping action of the dog 124 against the detent 120 produces a distinctive click that apprises the operator that the brake pedal 80 is unlatched. As a result, the brake pedal 80 will return to its at-rest position under the biasing forces of the return spring 96 and the accumulator spring 246 when the operator releases the brake pedal 80.

The brake pedal 80 places a substantial moment on the swing arm 112 during the return stroke of the brake pedal 80. The dog 124 on the swing arm 112 produces a corresponding moment on the upper surface of the detent 120 of sufficient magnitude to pivot the control arm 110 counter-clockwise from the position of FIG. 11 until the control arm 110 again assumes the position seen of FIG. 7. The over-center spring 114 therefore moves back to its first over-center position so that it again biases the swing arm 112 downwardly. In addition, the lug 166 on the inner lateral surface of the swing arm 112 engages the second leg 160 of the toggle arm 156 during the return stroke to cause the toggle arm 156 to pivot clockwise to permit unobstructed movement of the lug 166 past the toggle arm 156 as illustrated in FIG. 14. The toggle arm 156 then drops back into its initial position under the biasing force of the spring 164 so that it is primed for the next service braking cycle.

Brake pedal release using the accelerator pedal 82 occurs in similar sequence.

The operator presses downwardly on the accelerator pedal 82 so that the lever arm 172 engages the kickoff arm 170. This engagement forces the swing arm 112 to swing clockwise about the pivot tube 142 to drive the control arm 110 to pivot from the position illustrated in FIG. 9, through the position illustrated in FIG. 11, and to the position illustrated in FIG. 7 as described above. As before, this movement unlatches the swing arm 112 from the control arm 110 and permits the brake pedal 80 to return to its at-rest position under the biasing force of the brake pedal return spring 96 and the accumulator spring 246. Also as before, this movement forces the control arm 110 and over-center spring 114 back to the initial position of FIG. 7. Because the cutout 154 in the cam surface 140 is tangential to the swing arm pivot arc, the cam roller 138 simply moves circumferentially along the cam surface 140 during the initial, accelerator pedal imposed phase of the unlatching operation without resistance from the rather substantial return force imposed on the brake pedal 80 by the brake pedal return spring 96 and the accumulator spring 246. Brake pedal unlatching therefore imparts little resistance to accelerator pedal motion, and brakes 52 are disengaged after the first 1–3 inches of accelerator pedal stroke with minimal operator effort. In fact, due to the configuration of the locking mechanism 84, the brake pedal 80 and locking mechanism 84 impart less than 1.0 lbs, and preferably less than 0.5 lbs, of resistance to accelerator pedal motion. As a result, the operator can "feather" accelerator pedal motion so that the brakes 52 can be disengaged without over-depressing the accelerator pedal 82. This eliminates jerky motion or quick starts often associated with golf cars and other light-duty vehicles whose unlocking mechanism typically impart 5 lbs or more of resistive force to accelerator pedal movement when the brake pedal is unlatched by actuating the accelerator pedal.

4. Master Cylinder and Unboosted Accumulator Assembly a. Construction of Assembly The master cylinder 60 and hydraulic accumulator 62 are configured to translate the mechanical actuating forces generated by brake pedal depression into hydraulic pressure that first engages the brakes 52 and that then stores additional energy for holding the brakes 52 in their engaged condition. This energy storage provides several benefits. For instance, it permits the brake system 50 to make up for "creep" or fluid pressure loss that may occur due, e.g., relaxation of elastomeric components of the system. Moreover, it can assist in returning the brake pedal 80 to its at rest position following release of a locked brake pedal.

Referring to FIGS. 2–5, 15, and 16, the master cylinder 60 is generally conventional. It includes a housing 200 having an internal horizontal bore 202 formed therein. A reservoir 204 is formed above the bore 202 for storing hydraulic fluid. The bore 202 has an upper fill inlet 206 and a rear outlet 208. The inlet 206 cooperates with the reservoir 204. The rear outlet 208 opens into an accumulator chamber 210, detailed below. The master cylinder main piston 104 is slidably mounted in the bore 202 so as to extend rearwardly from the rear end of the bore 202 and into contact with the roller 103. As a result of this arrangement, 1) depression of the brake 80 and consequent swinging movement of the actuator pin 102 and roller 103 drives the main piston 104 forwardly through the bore 206 to pressurize the outlet 208, and 2) release of the brake pedal 80 permits the main piston 104 to move rearwardly through the bore 202 to depressurize the outlet 208.

Referring to FIGS. 15–18, accumulator chamber 210, as well as the remainder of the accumulator 62, may be located at any pressurized point in the braking system 50. In the illustrated embodiment, however, the chamber 210 is formed in an extension 212 of the master cylinder housing 200 extending essentially collinearly with the bore 202 so as to reduce the number of parts in the accumulator 62 and to facilitate assembly. In fact, this and other aspects of the relationship between the accumulator 62 and master cylinder 60 permit the master cylinder 60 and accumulator to be mounted on the mounting bracket 66 or another suitable support structure as a single integrated assembly. The accumulator chamber 210 has a first orifice 218 in a rear wall thereof that opens directly into the master cylinder outlet 208, and a second orifice 220 in an upper wall thereof that communicates with a bleeder port 222 and a brake supply orifice 224 in the master cylinder housing extension 212. The orifice 224 is connected to the front and/or rear vehicle brakes 52 via associated brake lines 56 (only one of which is illustrated in FIG. 1).

Figure 17:
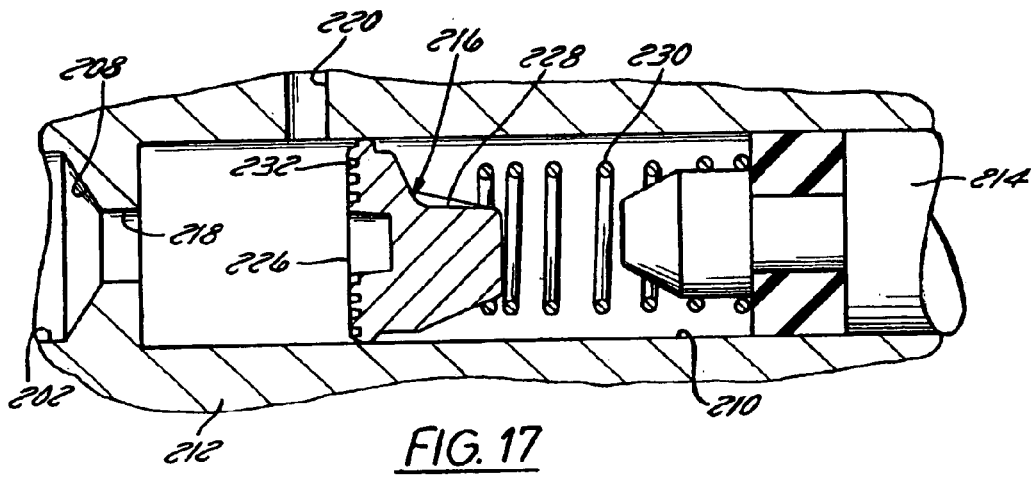
FIG. 17 is sectional fragmentary view of a portion of the assembly of FIG. 15, illustrating a one-way restrictor valve of the assembly in an open or free flow position thereof.
Figure 18:
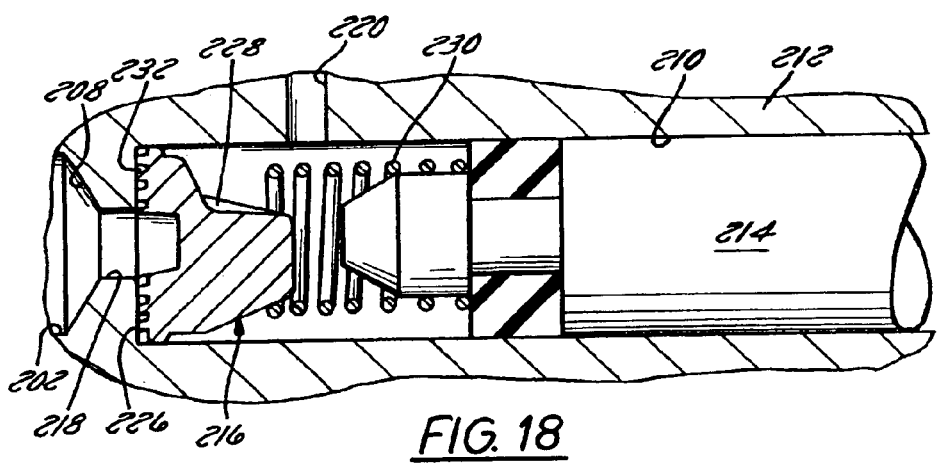
FIG. 18 corresponds to FIG. 17 and illustrates the one-way restrictor valve in a closed or restricting position thereof.
Figures 19, 20:
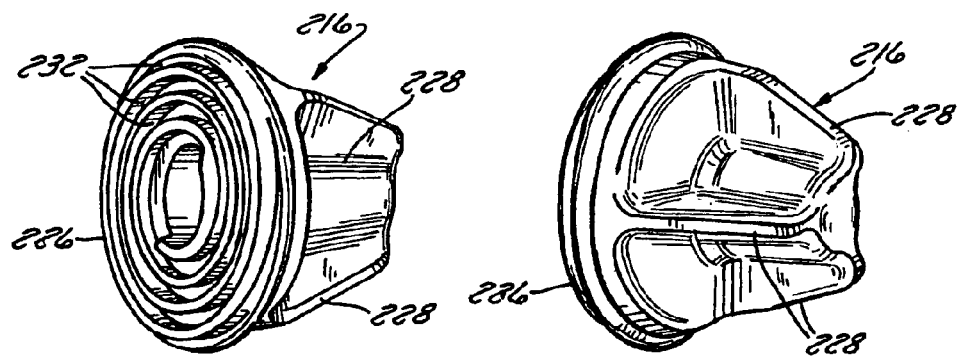
FIGS. 19 and 20 are rear and front perspective views, respectively, of the restrictor valve of FIGS. 17 and 18.
Figure 21:
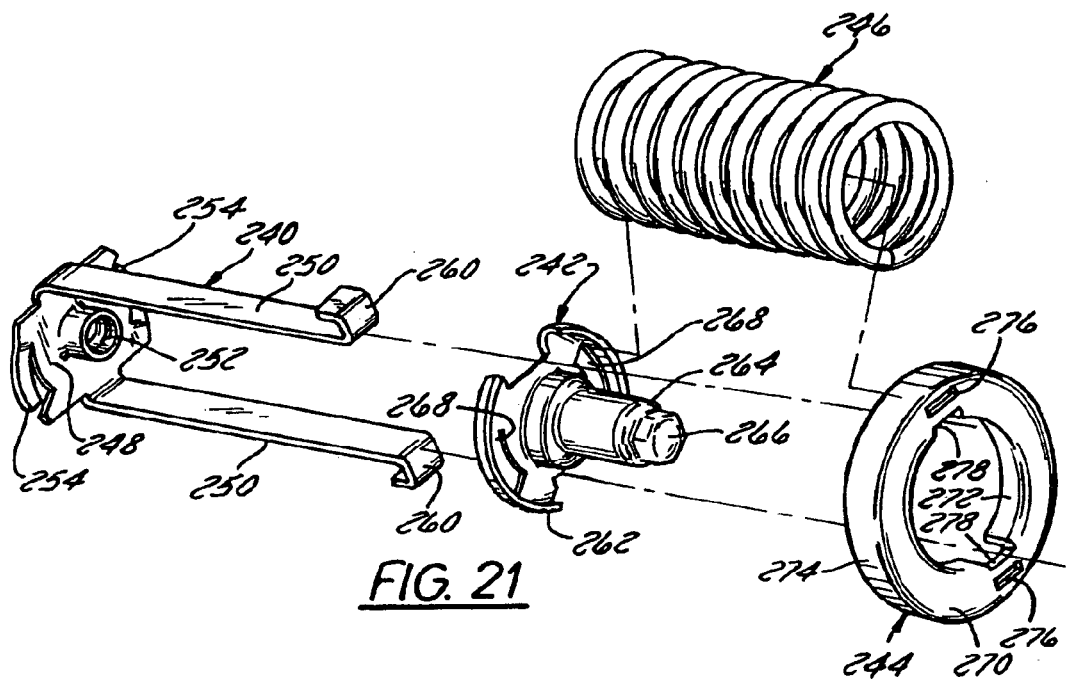
FIG. 21 is an exploded perspective view of the accumulator.

Referring to FIGS. 17 and 18, an accumulator drive piston 214 and a one-way restrictor valve 216 are mounted in the accumulator chamber 210. The accumulator drive piston 214 is slidably mounted in the chamber 210 so as to extend beyond a rear end of the master cylinder extension 212 and into contact with the accumulator spring assembly 62. The one-way restrictor valve is positioned forwardly of the accumulator drive piston 214 and is biased toward the front of the chamber 210 by a return spring 230 that is seated on the one-way restrictor valve 216 at its front end and on the accumulator drive piston 214 at its rear end.

The purpose of the one-way restrictor valve 216 is to damp return fluid flow into the master cylinder 60 from the accumulator chamber 210 upon release of the brakes 52, thereby inhibiting the pronounced brake pedal snapback effect exhibited by most park and hold brake systems of this type. The energy stored in the accumulator 62 and the brakes 52 instead is released more gradually, permitting a much smoother brake pedal return. Referring to FIGS. 17–20, the one-way restrictor valve 216 has an annular rear axial face 226 and a plurality of guide ribs 228. The guide ribs extend forwardly from the rear face 226 to a front end of the valve 216 to support and guide the front end of the return spring permitting free fluid flow to the rear face 226 of the one-way restrictor valve 216. The rear face 226 has a groove 232 formed therein that creates a convoluted elongated flow path from the accumulator chamber 210 to the master cylinder outlet 208 when the face 226 is seated against the rear end of the accumulator chamber 210 as seen in FIG. 18. Fluid flow effects, head losses and other flow reduction effects provided by this fluid flow through elongated flow path provide the same flow restriction as a conventional restricting orifice. However, the orifice produced by this convoluted flow path produces several benefits not achieved by a conventional restricting orifice. First, it is less susceptible to plugging than a conventional restricting orifice due to its much larger physical size and is self-cleaning, particularly when the valve 216 moves to its open position to fully expose the rear face 26 of the valve to allow fluid flow therepast. It is also less susceptible than a conventional restricting orifice to variations in hydraulic fluid flow rates that are likely to occur over the expected range of hydraulic fluid operating temperatures.

Virtually any effective orifice diameter can be achieved by appropriately selecting the length, shape, and cross-sectional area of the groove 232. In order to provide the desired damping effect, the illustrated flow path has an equivalent orifice diameter of less than 0.0025" and preferably of approximately 0.0015". It has a square cross-section that is approximately 0.025" on a side and a length of several inches. Its shape is preferably spiral, but other convoluted shapes could be employed.

The hydraulic accumulator 62 performs several beneficial functions. For instance, it reduces the effort required by the operator to depress the brake pedal 80 to its locked position. It also stores energy generated upon manual pressurization of the hydraulic fluid in a form that can then be used to maintain the brakes 32 in their engaged positions after the brake pedal 80 is locked. Finally, it assists in returning the brake pedal 80 to its released position upon brake pedal unlocking. The preferred accumulator structure is one that has a minimum number of components and that can be readily assembled as a unit offsite and then attached to the remainder of the brake assembly 50 by an unskilled operator. Towards these ends, the hydraulic accumulator 62 is a spring type accumulator taking the form best seen in FIGS. 15, 16, and 21–23. It includes a retainer 240, a movable compression plate 242 disposed at the rear end of the retainer 240, a cap 244 affixed to the front end of the retainer 240, and a compression spring 246 captured between the compression plate 242 and the cap 244.

Figure 24:
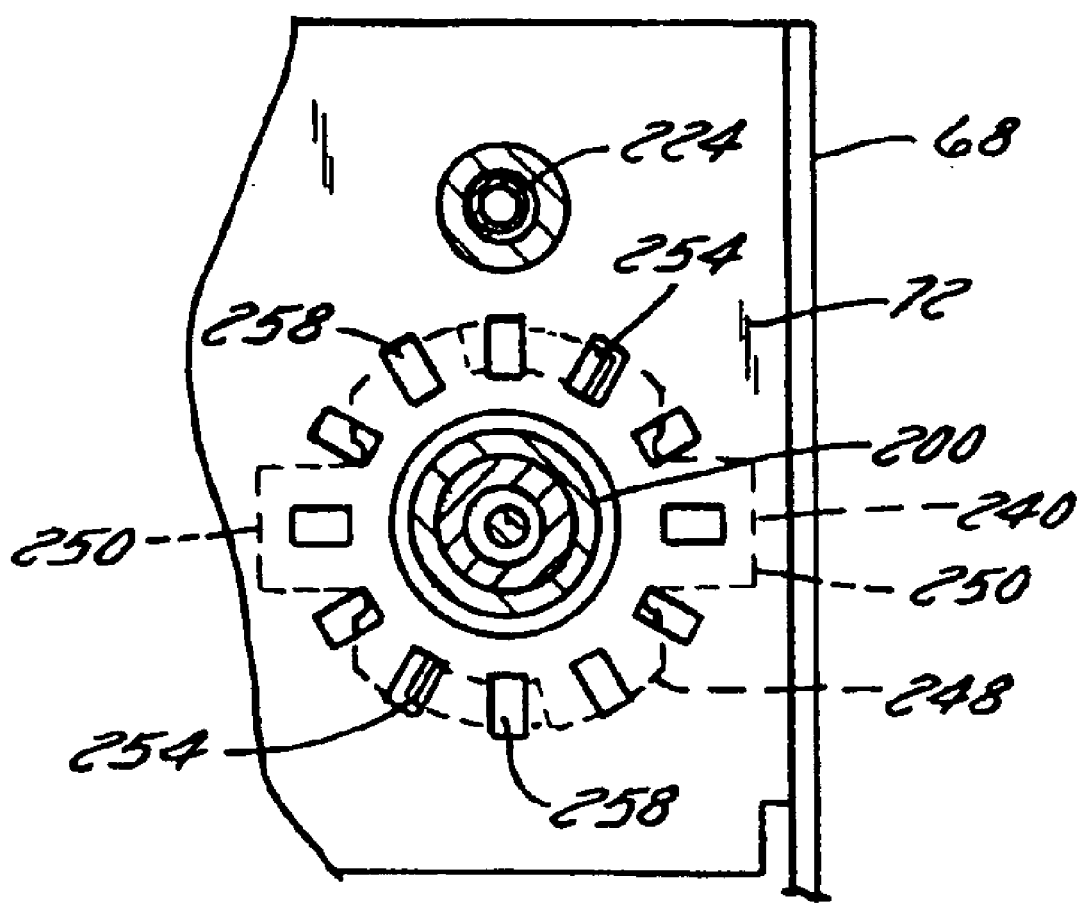
FIG. 24 is sectional end view taken generally along the lines 24—24 in FIG. 16.

The retainer 240 includes a front mounting plate 248 and a plurality (preferably two) straps 250 that extend rearwardly from the mounting plate 248. The mounting plate 248 has an internally threaded post 252 and a pair of tangs 254 located radially outside of the post 254 and bent in opposite directions. As best seen in FIGS. 15 and 16, the threaded center post 252 screws onto external threads 256 on the master cylinder housing extension 212, and the tangs 254 lock into slots 258 in the front wall 72 of the support bracket 66 when the post 252 is fully tightened onto the master cylinder housing extension 212 as best seen in FIG. 24. The accumulator 62 can subsequently be unscrewed from the master cylinder housing extension 212 only by overtorquing the accumulator 62 in a counter-clockwise direction to release the tangs 254 from the slots 258. The straps 250 serve as mounts for the cap 244 and are configured to guide and support both the spring 246 and the compression plate 242. Each strap 250 extends rearwardly from the mounting plate 248 and terminates in a hook 260 at its distal end. The bodies of the straps 250 serve as supports and guides for the compression plate 242 and the spring 246. The hooks 260 latch onto the cap 244 as detailed below to fix the cap in place.

The compression plate 242 includes a rear annular spring support portion 262 and a cup portion 264. The cup portion 264 extends axially forwardly from the center of the rear spring support portion 262 to a front nut portion 266. Spring support portion 262 presents a seat for the rear end of the accumulator spring 246. Cup portion 264 is configured to surround the end of the master cylinder housing extension 212 and to abut the front end of the accumulator drive piston 214 as best seen in FIGS. 15 and 16. Apertures 268 are formed in the spring support portion 262 for passage of the straps 250. Upon assembly, this relationship between the straps 250 of the retainer 240 and the apertures 268 in the compression plate 242 permits the compression plate 242 to move axially relative to the retainer 240 but prevents relative rotational movement between the compression plate 242 and the retainer 240.

Figure 22:
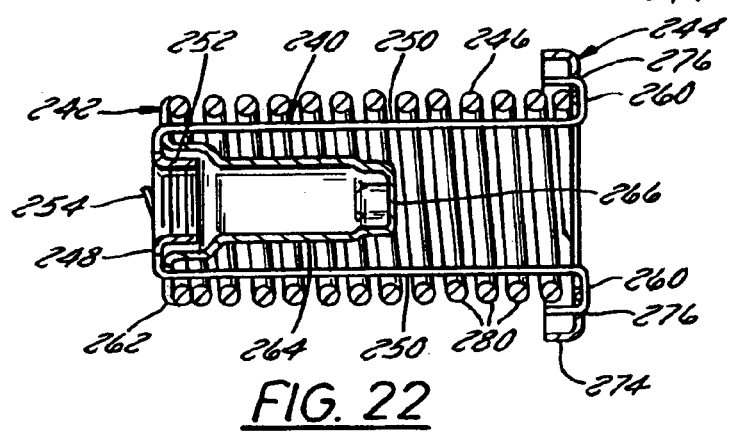
FIG. 22 is a sectional side elevation view of the accumulator.
Figure 23:
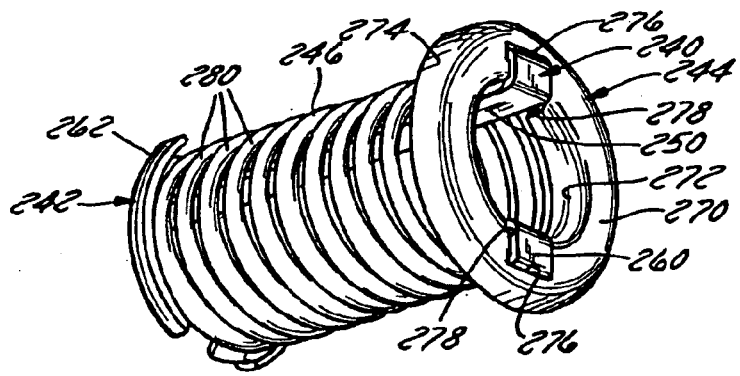
FIG. 23 is a perspective view of the accumulator.

The cap 244 comprises a metal annular ring having a circular axially front end portion 270 and inner and outer circular flanges 272 and 274. The flanges 272 and 274 extend rearwardly from the front end portion 270 so as to form a groove serving as a second seat for the spring 246. A pair of hook receiving apertures 276 are formed in the front end portion 270 adjacent to corresponding notches 278. As best seen in FIGS. 22 and 23, the notches 278 are configured to receive the straps 250 and the hooks 260 of the retainer 240, thereby locking the cap 244 onto the retainer 240.

b. Assembly and Operation of the Unboosted Accumulator

The accumulator 62 is assembled as a unit at a location remote from the remainder of the system 50. The entire assembly 240, 242, etc. can be assembled as a unit and then screwed onto the master cylinder housing extension 212 using the nut portion 266 on the cup portion 264. First, the apertures 268 in the compression plate 242 are slid over the straps 250 of the retainer 240, and the compression plate 242 is pushed downwardly onto the mounting plate 248 of the retainer 240. Then, the spring 246 is positioned over the straps 250 so that its rear end rests on the spring seat formed by the annular portion of the compression plate 242. In this initial, uncompressed state of the spring 246, the spring actually extends beyond the front end of the retainer 240. Next, the assembler forces cap 244 downwardly against the spring 246 to compress the spring 246 while simultaneously pinching the straps 250 of the retainer 240 radially inwardly to align the straps 250 with the notches 278 in the inner periphery of the cap 244. The assembler then forces the cap 244 through the notches 278 in the cap 244 and positions the cap 244 so that the hooks 260 on the straps 250 are aligned with the apertures 276 in the front end wall portion 270 of the cap 244. The assembler then releases the spring 246 so that it forces the apertures 276 in the cap 244 through the hooks 260 as seen in FIG. 22.

The spring 246 is precompressed a substantial amount as a result of the preassembly process. As discussed in more detail below, this spring precompression sets a threshold pressure below which substantially all work performed by the master cylinder 60 is applied toward fluid pressurization and above which the majority of the work performed by the master cylinder 60 is applied toward energy storage in the accumulator 62. The amount of precompression required for a particular pressurization threshold level will vary depending on the spring rate of the spring 246 and its caged height. The spring 246 of the illustrated embodiment has a free length of about 9" and a spring rate of 25 lbs/in. It is precompressed to an installed length of approximately 4" during the assembly process to provide a threshold pressure of about 800–850 psi.

Next, the preassembled accumulator 62 is mounted on the master cylinder housing extension 212 by turning the nut 266 to thread the post 252 onto the threads 256 on the master cylinder housing extension 212 until the tangs 254 on the mounting plate 248 lock into opposed slots 258 in the front wall 72 of the support bracket 66 as seen in FIG. 24. The accumulator 62 is now positioned so that accumulator drive piston translation, occurring upon master cylinder actuation and consequent pressurization of the accumulator chamber 210, will force the compression plate 242 forwardly to compress the spring 246 as seen in FIG. 15.

Figure 25:
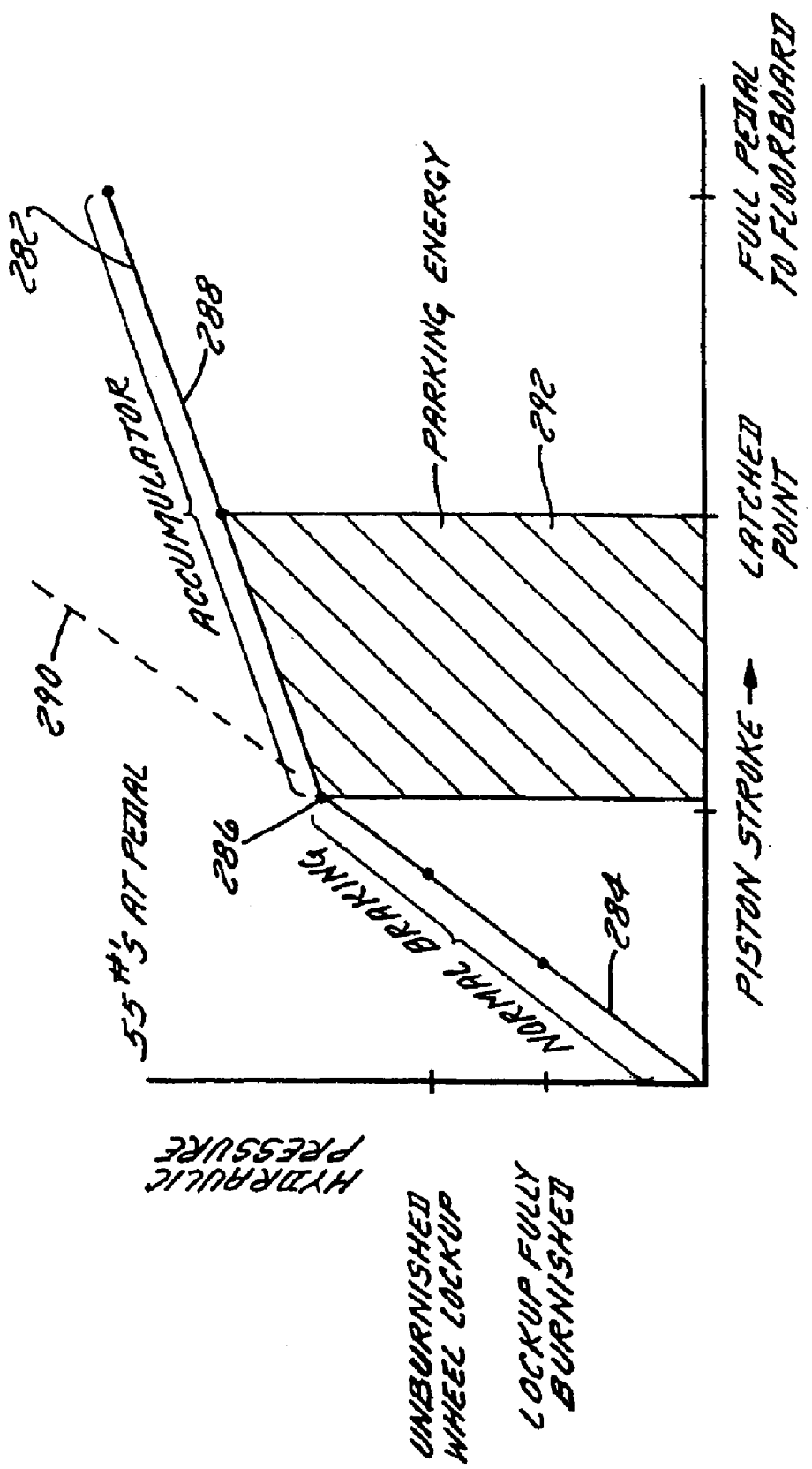
FIG. 25 is a graph illustrating the effect of the accumulator on a braking operation.

In use, the accumulator 62 assumes the position illustrated in FIG. 16 when the brakes 52 are released. At this time, the one-way restrictor valve 216 is seated on the face of the chamber 210 under the biasing force of the spring 230 as seen in FIG. 18, and the compression plate 242 is seated on the face of the mounting plate 248 as seen in FIG. 16. When the operator depresses the brake pedal 80 to actuate the master cylinder 60, the system hydraulic pressure increases generally linearly as represented by the portion 284 of the curve 282 in FIG. 25, thereby opening the one-way restrictor valve 216 and engaging the brakes 52. The pressure generated by brake pedal actuation will increase rapidly and generally linearly with pedal stroke until system pressure increases to the threshold pressure set by the precompression of the spring 246. This threshold pressure, which forms the transition point between pressure intensification and energy storage phases of brake pedal stroke, is illustrated at point 286 in FIG. 25.

The precompression of the accumulator spring 246 is selected to set the threshold pressure to a level well above the lockup point of the brakes 52 but well below the single latch point of the brake pedal 80 detailed in Section 3 above. In a system in which the brake pedal is latched in position 8" into its stroke, service braking is performed in the first 2 to 3" of brake pedal stroke even under panic stop conditions. In fact, brake lockup typically occurs after no more than 2½"

of brake pedal stroke. Typical lockup points for fully burnished and unburnished brakes are denoted as such in FIG. 25.

Additional brake pedal depression past the threshold point 286 compresses the accumulator spring 246, thereby storing the energy of master cylinder actuation in the form of potential energy in the spring 246. System pressure rises at a much slower rate during this phase of pedal actuation, as represented by the shallow portion 288 of the curve 282. This effect results from the fact that the incremental increase in input force required to compress the spring 246 is substantially lower than the incremental increase in input force required to additionally pressurize the hydraulic fluid. As a result, resistance to brake pedal movement during this second phase of brake pedal actuation increases at a much slower rate than during the first phase.

In the illustrated embodiment, the transition point 286 between the first and second phases of brake pedal actuation occurs at approximately 800–850 psi of hydraulic pressure. Pressure thereafter rises gradually to about 900–950 psi when the brake pedal 80 is latched in its locked position and the end of the second phase of its actuation stroke. The compression spring 246 is compressed about Y2" at this time. At least 50%, and possibly at least 65% or more, of the total pedal stroke required to latch the brake pedal 80 in its locked position is consumed in the second phase of brake pedal actuation. As a result, by the end of this phase, more than ample energy is stored in the accumulator 62 to hold the brakes 52 and to return the brake pedal 80 with little additional effort by the operator. (The amount of energy stored by the accumulator 62 is represented by the hatched area 292 under the curve 282 in FIG. 25.)

Considerable work is performed over the rather lengthy second phase of the brake pedal actuation stroke, but at much lower input forces than would be required to perform the same amount of work (and hence to store the same amount of energy) over a shorter stroke. In fact, the transition point 286 is reached at an operator input force of about 35 lbs, and only an additional 25 lbs of input force is required to depress the brake pedal 80 to its latch point. This is in contrast to the drastically higher input force that would be required to pressurize the fluid to a much higher level if the operator were to press the brake pedal 80 to its latch point without an accumulator in the system (see the phantom line 290 in FIG. 25). Hence, the accumulator 62 greatly facilitates brake pedal latching and reduces the precision required to achieve the latch point because the operator strokes the pedal a great distance easily.

Upon brake pedal release, the one-way restrictor valve 216 immediately seats against the front end of the chamber 210 under the force of the return spring 230, thereby preventing rapid depressurization of the accumulator chamber 210. The damping effect provided by this restricted fluid flow imposes a relatively low return speed on the brake pedal 80 that continues for a period of time. The brake pedal 80 consequently returns to its initial position without any undesirable rapid snapback that otherwise would produce substantial wear and tear on the system and even risk injury to the operator. The damping grease between the brake pedal pivot shaft 86 and the stationary sleeve 92 additionally damps brake pedal return movement at this time. However, the combined damping effect provided by the one-way restrictor valve 216 and the damping grease does not overly-damp brake pedal return. Instead, the brake pedal 80 is biased by the springs 96 and 246 to quickly follow the operator's foot without pushing the foot upwardly too fast. The remaining, small snapback impact forces resulting from this moderate return speed are absorbed by the elastomeric bumper 148 on the swing arm 112 when the brake pedal 80 reaches its at-rest or fully released position, resulting in a virtually noiseless and vibrationless pedal return.

5. Construction and Operation of Boosted Master Cylinder/Accumulator Assembly

Figure 32:
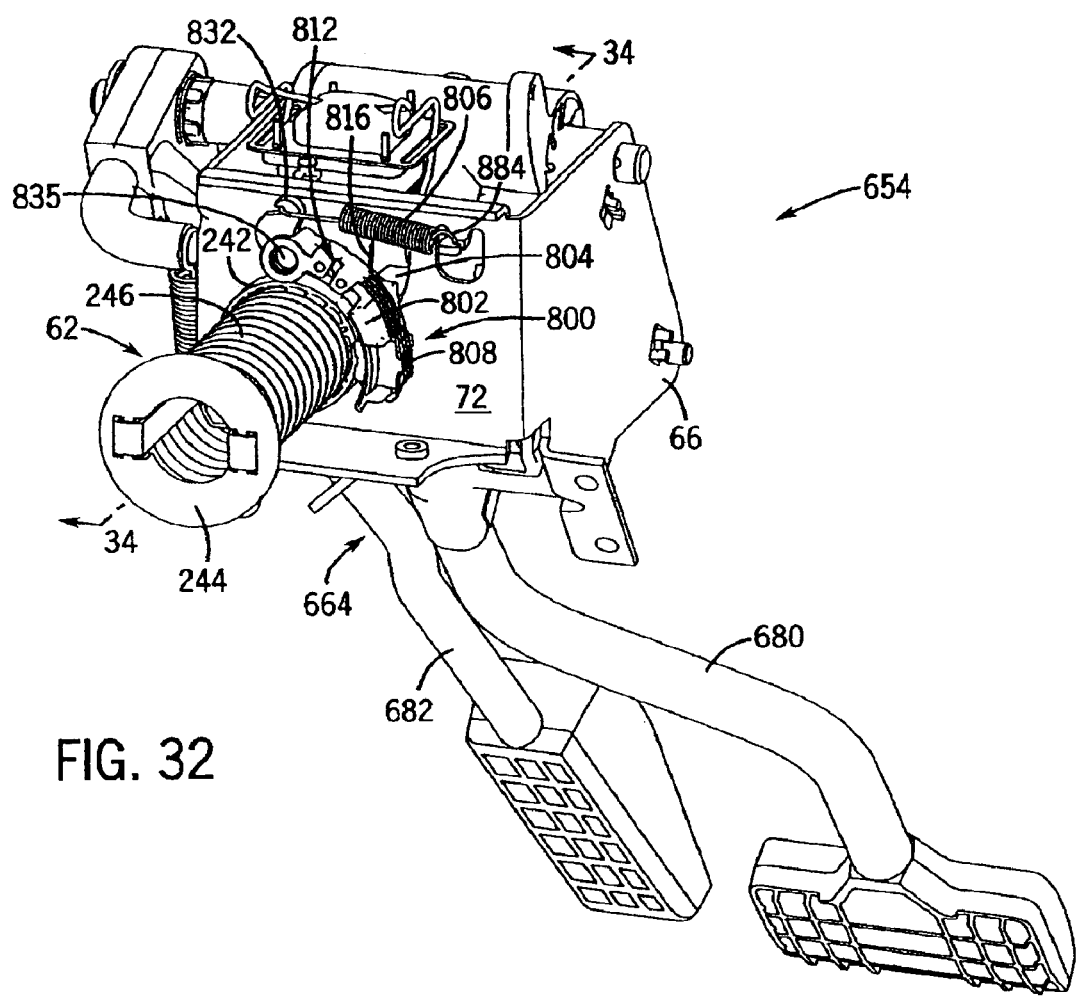
FIG. 32 is a perspective view of a master cylinder/accumulator assembly constructed in accordance with another embodiment of the invention and incorporating a booster for the accumulator.
Figure 33:
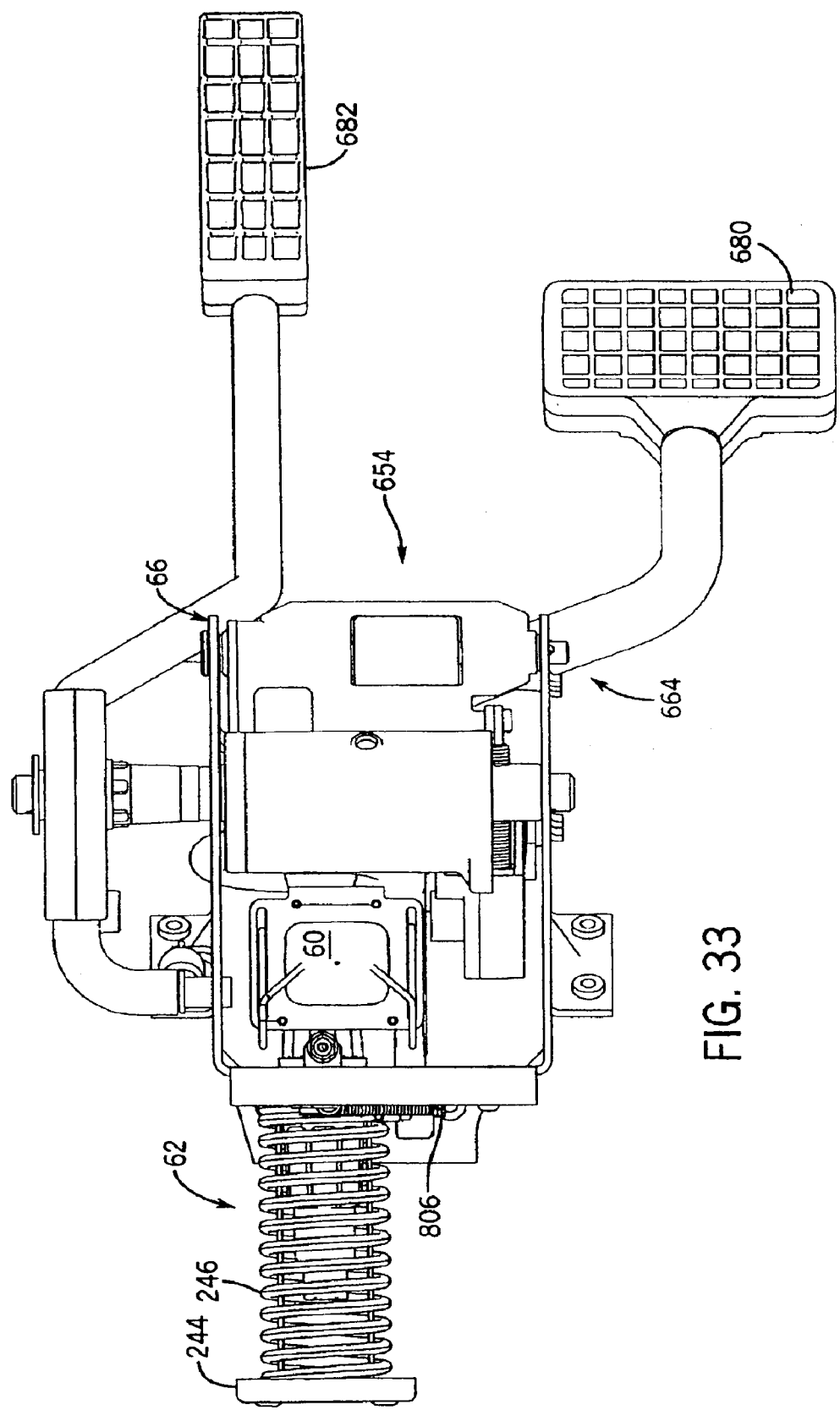
FIG. 33 is a top plan view of the assembly of FIGS. 31 and 32.
Figure 34:
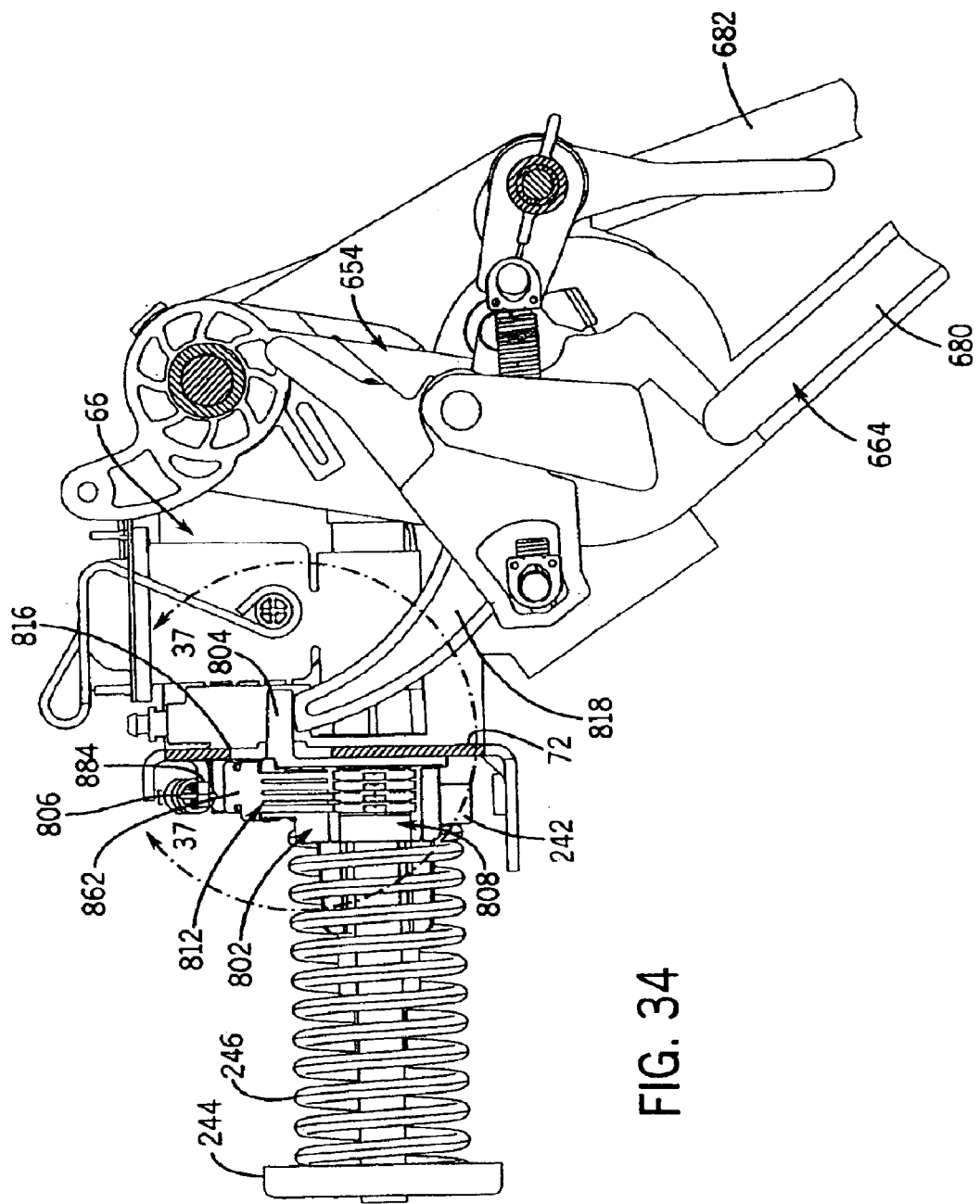
FIG. 34 is a side sectional elevation view of the assembly of FIGS. 31–33, illustrating the assembly in a first position thereof.
Figure 37:
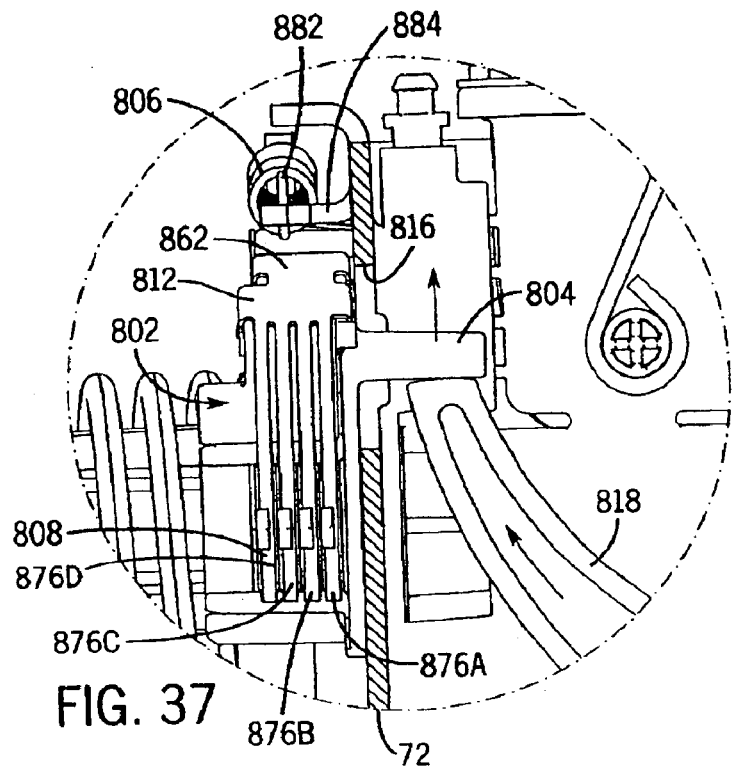
FIG. 37 is a detail view taken along the line 37—37 in FIG. 34.
Figure 38:
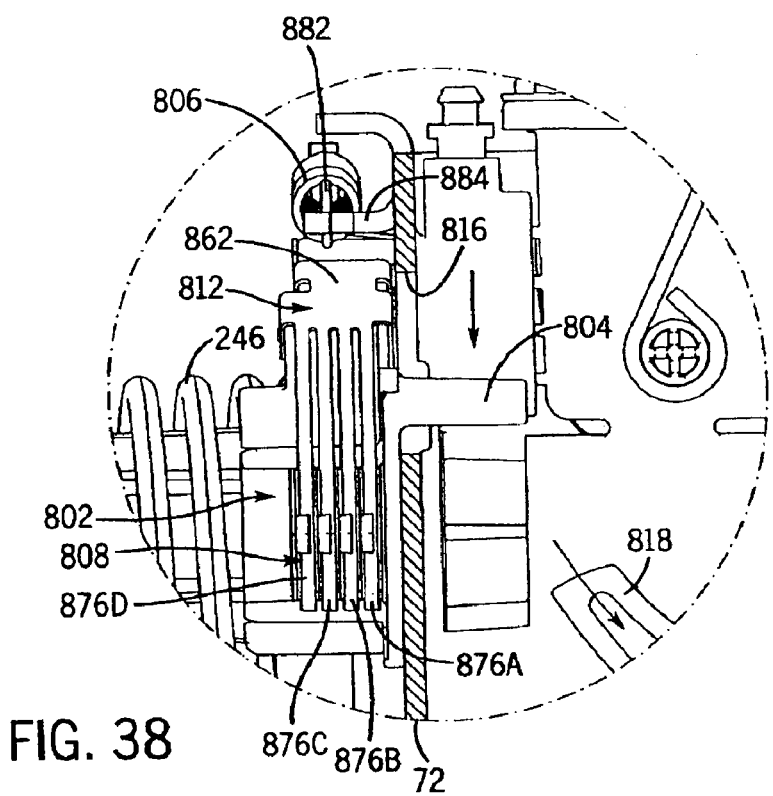
FIG. 38 is a detail view corresponding to FIG. 37 but illustrating the assembly in another operating position thereof.
Figure 39:
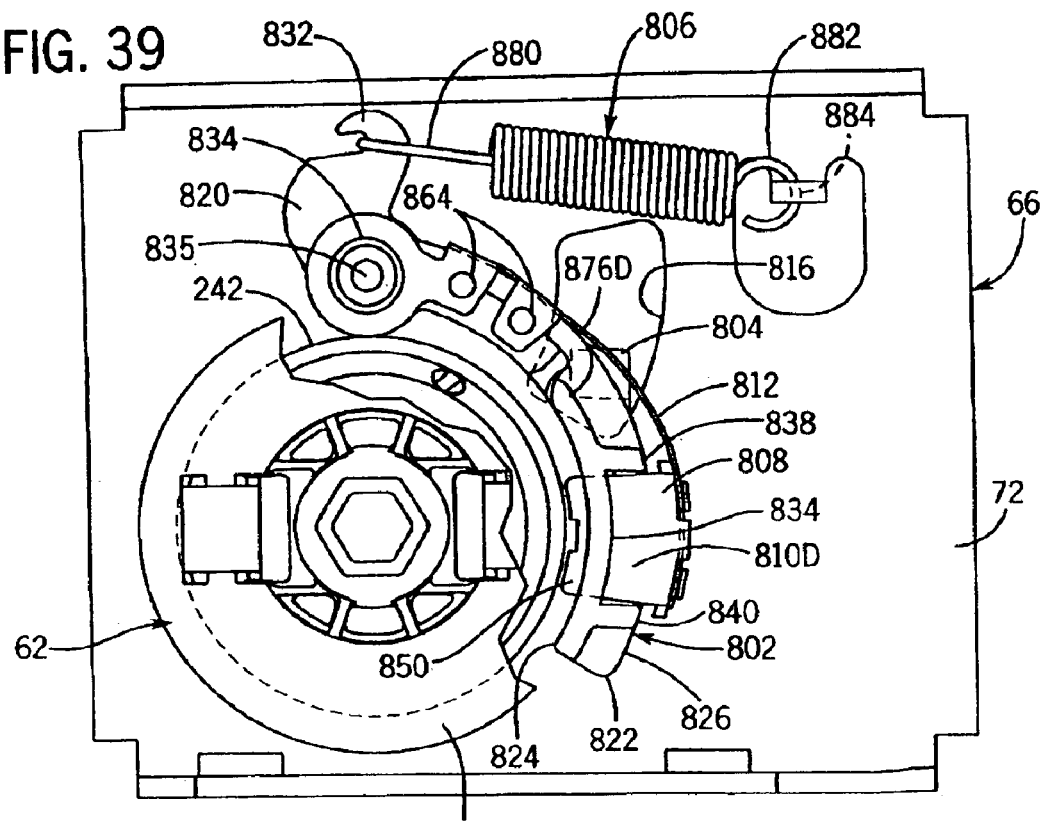
FIG. 39 is a front elevation view of portion of the assembly of FIGS. 32–34, illustrating the assembly in a first position thereof.
Figure 40:
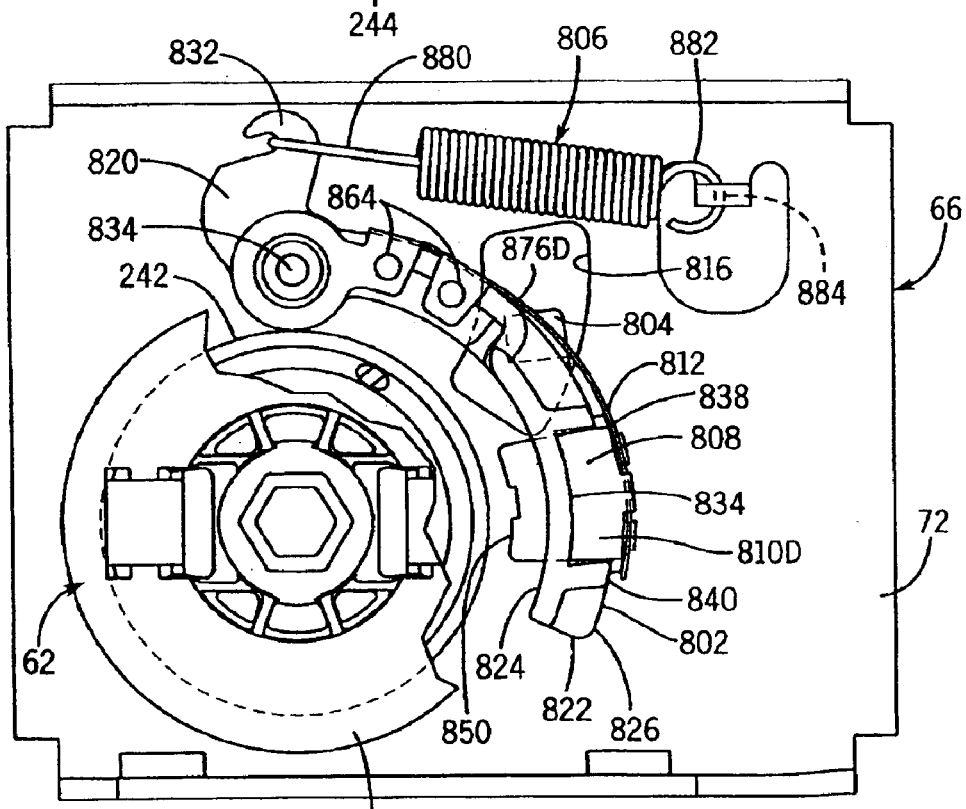
FIG. 40 corresponds to FIG. 39 but illustrates the assembly in a second position thereof.
Figure 41:
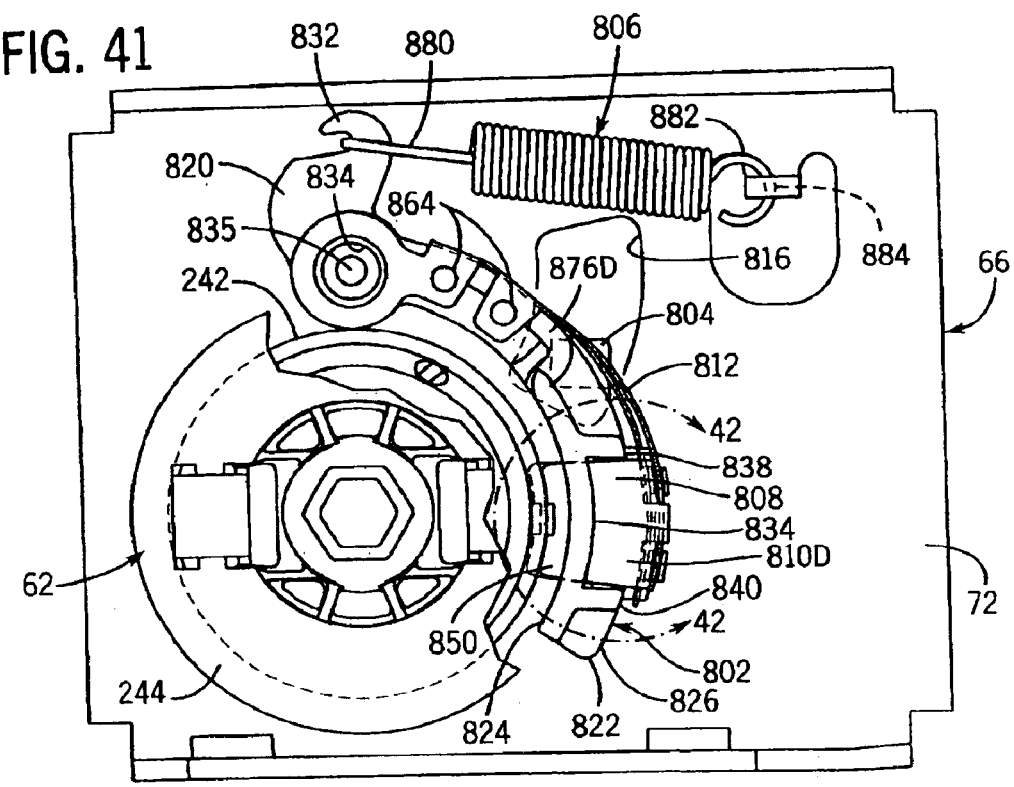
FIG. 41 corresponds to FIG. 39 but illustrates the assembly in a third position thereof.
Figure 42:
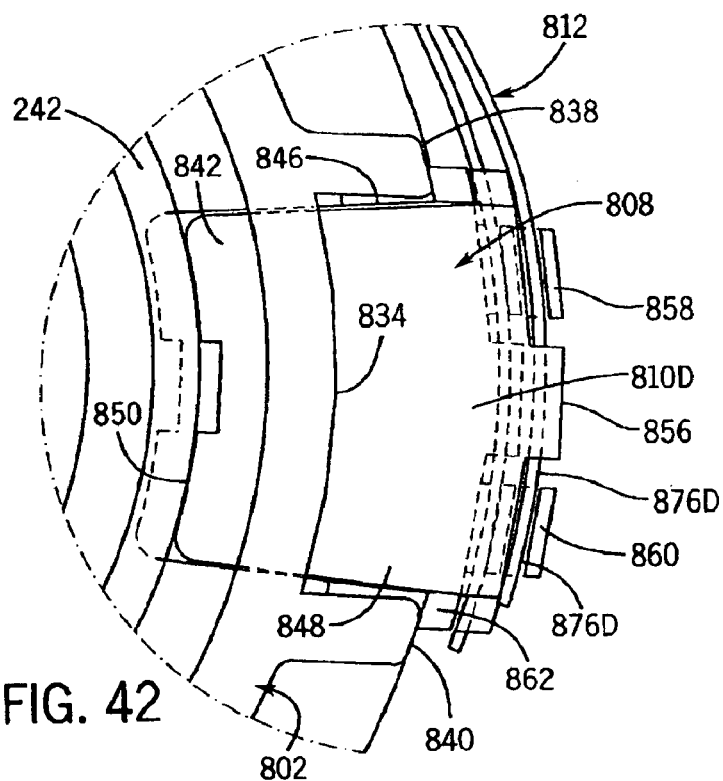
FIG. 42 is a detail view of a portion of the assembly in the position illustrated in FIG. 41.
Figure 43:
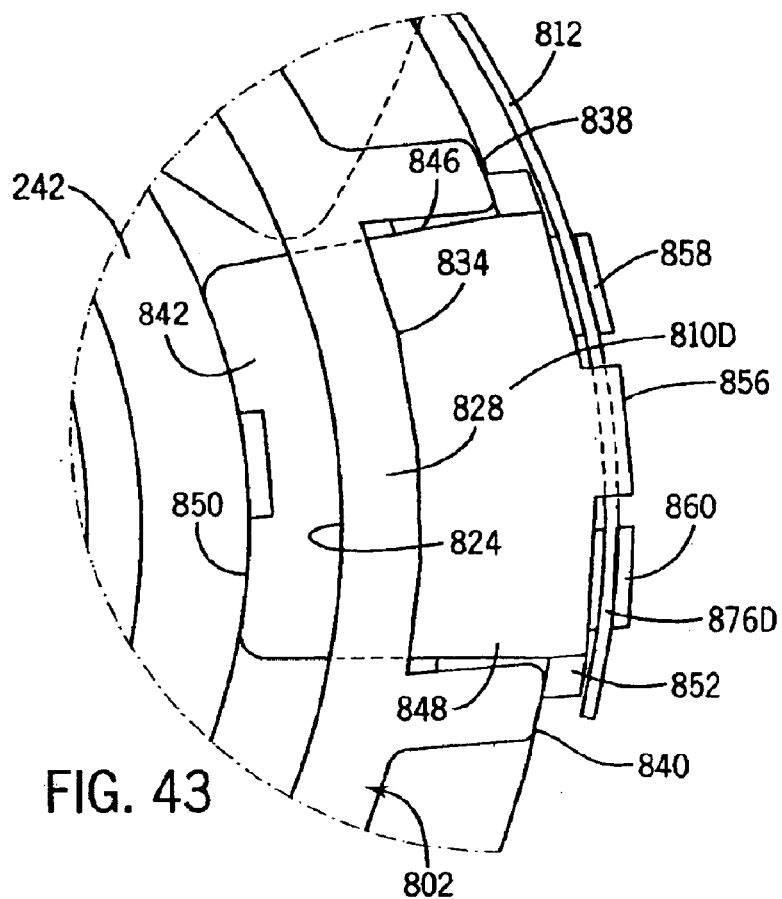
FIG. 43 corresponds to FIG. 42 and illustrates the assembly in another operating position thereof.
Figure 44:
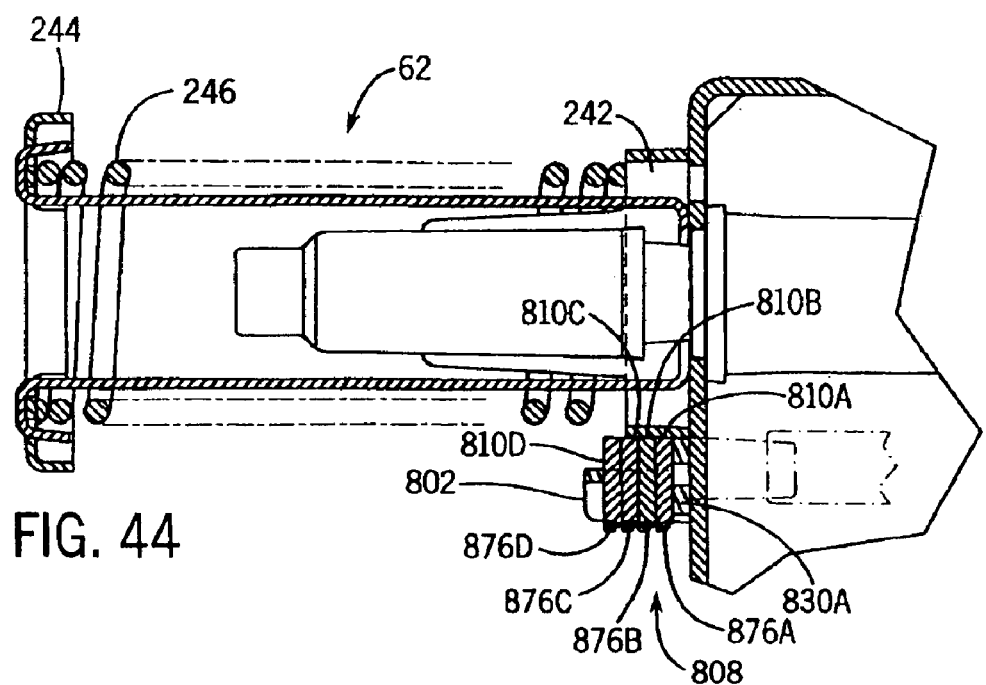
FIGS. 44–49 are a series of sectional side elevation views illustrating the assembly of FIGS. 32–34 in various operational states thereof.

The accumulator described above stores ample energy to prevent creep and to return the master cylinder and pedal assembly to its released position under all operating conditions in some systems. However, in some systems, it might be desirable to boost the energy storage capacity of the accumulator for the purposes of, e.g., compensating for hydraulic pressure losses in the system resulting from dramatic temperature drops. A brake actuator and release assembly 654 that is boosted to obtain these benefits is illustrated in FIGS. 32–49. The assembly 654 includes the same master cylinder 60 and accumulator 62 described above. Referring initially to FIG. 32–34, it also includes an integrated brake pedal assembly 664 that is essentially identical to the assembly 64 described above, as well as a booster 800 that automatically and progressively boosts the energy storage capacity of the accumulator 62 during successive brake, hold, and release cycles. Before describing the details of the booster 800 and its interaction with the previously described master cylinder 60 and accumulator 62, it must be emphasized that the illustrated booster 800, as well as a variety of other boosters constructed in accordance with the invention, are usable with a variety of hydraulically actuated park and hold braking systems other than the one illustrated herein. They are also usable on a variety of utility and other off-highway vehicles other than the golf car illustrated in FIG. 1 and described above. The illustrated booster 800 and/or the corresponding accumulator 62 could also be mounted on structures other than the master cylinder housing 66 described above in conjunction with the unboosted embodiment. Hence, it is understood that the booster 800 is described herein in conjunction with the master cylinder 60 and accumulator 62 of the previous embodiments solely for the sake of simplicity.

Still referring to FIGS. 32–34, the booster 800 is configured to cooperate with the accumulator 62 so as to 1) prevent complete energy release when the brake pedal is released following an initial park and hold event and 2) thereafter cause the accumulator 62 to store progressively greater magnitudes of energy during subsequent park, hold, and release cycles up to the boosting capacity of the booster 800. The booster 800 is also configured so as not to require any modification to the existing accumulator or master cylinder design. Hence, the master cylinder 60 and booster 62 are mounted on the same master cylinder housing 66 described above, with the booster 800 being mounted on the front wall 72 of the master cylinder housing 66 and the master cylinder 60 being contained within the housing 66. The master cylinder 60 is applied through operation of a brake pedal 680 that is only slightly modified with respect to the brake pedal 680 of the first embodiment (the relevant differences being discussed below). The remaining components of the brake pedal assembly 664 are at least functionally identical (and also structurally identical in the case of most components) to corresponding components of the first embodiment. Hence, the brake pedal 680 may be locked in position by the locking mechanism 654, and released through operation of either the brake pedal 680 or the accelerator pedal 682 in the same manner as described above. Also as discussed above in conjunction with the first embodiment, master cylinder piston movement occurring upon translation of the brake pedal 680 forces a movable compression plate 242 of the accumulator 62 towards a stationary cap 244 to compress a compression spring 246, hence storing energy at a magnitude determined by the length of the stroke of the compression plate 242 and the resultant extent of compression of the spring 246. A description of the construction and operation of the details of these various components is omitted to avoid duplication.

Still referring to FIGS. 32–34, the booster 800 is mounted on a support adjacent the rear end of the accumulator 62 so as to selectively interact with an axially movable portion of the accumulator 62 and arrest that portion from additional rearward movement during the release phase of a braking cycle having service of a park, hold, and release phases. In the illustrated embodiment, the booster 800 is mounted on the front surface of the front wall 72 of the master cylinder housing 66 and is configured to selectively engage a rear axial end of the compression plate 242. However, it could be mounted on other mounting structures and/or cooperate with other axial surfaces of the compression plate 242 or even other axial surfaces of the accumulator 62 as well.

The booster 800 of this embodiment includes an indexing arm 802, an actuator arm 804 that is configured for interaction with the brake pedal 680, and a return spring 806 that acts on the indexing arm 802 in opposition to the actuator arm 804. The indexing arm 802 is pivotally mounted on the front wall 72 of the master cylinder housing 66 above the accumulator 62. A variable width spacer 808 is mounted on the indexing arm 802 so as to 1) set and progressively increase the spacing between the compression plate 242 and the front wall 72 of the master cylinder housing 66 and 2) progressively increase that spacing in successive braking cycles up to a predetermined maximum. In the illustrated embodiment, the spacer 808 comprises a stack of spacer plates 810a–810d. The spacer plates 810a–810d are mounted on the indexing arm 802 and configured for limited movement relative to the indexing arm 802 against the resistance of a biasing arrangement 812 as described in more detail below. As best seen in FIGS. 32 and 34, the actuator arm 804 extends rearwardly from the indexing arm 802 and through an arcuate slot 816 in the front wall 72 of the master cylinder housing 66. The rear end of the actuator arm 804 is engaged by a protrusion 818 of the brake pedal 680 whenever the brake pedal is depressed beyond its service stroke. The actuator arm 804 otherwise is not engaged by the protrusion 818. As a result, the booster 800 is inactive during normal service braking of the vehicle.

Referring particularly to FIGS. 35 and 36, the indexing arm 802 comprises an arcuate unitary structure, preferably formed from an injection molded plastic material. It has upper and lower ends 820 and 822, inner and outer radial surfaces 824 and 826, and front and rear axial surfaces 828 and 830. The indexing arm 802 can be conceptually divided into a spring seat 832 at its upper end, a spacer receptacle 834 at its lower end, and a pivot point near its upper end. The pivot point of this embodiment comprises a bore 836 through which a pivot pin 835 (FIG. 32) extends. The actuator arm 804 preferably is molded integrally with the indexing arm 802. The spacer receptacle 834 comprises a generally rectangular opening extending radially through the indexing arm from the outer surface 826 to the inner surface 824.

The opening is bordered at its lower and upper ends by seats 838 and 840 on which individual plates 810a–810d of the spacer 808 are supported as discussed in more detail below.

The spacer plates 810a–810d are mounted in the spacer receptacle 834 of the indexing arm 802 as illustrated in FIGS. 35 and 36. In the illustrated embodiment, the plates additionally comprise an extension 830a of the rear axial surface 830 of the indexing arm 802 bordering the rear end of the receptacle 834. The effective thickness of the spacer 808 after given braking cycle depends upon the number of spacer plates 830a and 810a–810d that lodge between the compression plate rear end or other axial surfaces of the accumulator 62 and the master cylinder housing front wall 72 or other stationary surface of the system during the brake release phase of that cycle. The spacer 808 of the illustrated embodiment contains five effective spacers (four plates 810a–810d plus the booster wall extension 830a) each having a thickness T that may vary from plate to plate or that may be constant. In the illustrated embodiment, the spacer plates 810a–810d and the booster wall extension 830a each have a thickness T of 0.14", providing a maximum effective thickness of a spacer of 5×0.14 or 0.70".

Still referring to FIGS. 35 and 36, each of the plates 810a–810d has front and rear surfaces 842 and 844, lower and upper edges 846 and 848, an arcuate inner edge 850, an arcuate outer edge 852. The inner edge 852 has a radius of curvature generally matching that of the compression plate 842. Reliefs 854 are formed in the upper and lower portions of each of the front and rear surfaces 842 and 844 of each spacer plate to prevent binding by reducing the contact area between adjacent spacer plates. Each spacer plate additionally has a system of hooks that extend beyond the outer edge of the plate for engagement with the biasing arrangement 812. The hooks of each spacer plate consist of a central hook 856 located at or near the plate's front surface 842 and upper and lower hooks 858 and 860 that flank the central hook 856 and that are located at or near the plate's rear surface 844. These hooks 856, 858, and 860 engage the biasing arrangement 812 as described below.

Still referring primarily to FIGS. 35 and 36, the biasing arrangement 812 may comprise any structure that holds the spacer plates 810a–810d in the receptacle 834 in the indexing arm 802 but that selectively permits limited movement of the individual spacer plates away from the indexing arm 802 when the plate(s) engage the periphery of the compression plate 242 of the accumulator 62. The biasing arrangement 812 of the illustrated embodiment comprises a leaf spring assembly mounted on the indexing arm 802. The assembly is formed of spring steel and is curved about a radius of curvature less than that of the outer peripheral surface 826 of the indexing arm 802 to preload the assembly. It can be conceptually divided into an upper mounting portion and a lower biasing portion. The mounting portion includes an arcuate plate portion 862 and front and rear tabs 864 and 866 that are bent inwardly relative to the plate portion 862 so as to engage the corresponding front and rear surfaces 828 and 830 of the indexing arm 802. The front tab 864 has a large aperture 868 formed therein for receiving the pivot pin 835. Additional apertures 870 and 871 are also formed in tabs 864 and 866 for engagement with holding pins 872 and 874 located on the inner surface 824 of the indexing arm 802. The spring portion includes arcuate tines extending downwardly from the mounting portion. Four tines 876a–876d are provided in the illustrated embodiment. They are spaced from one another such that 1) the hooks 856, 858, and 860 of the first spacer plate 810a in the stack extend between and 2) are held by the rearmost tine 810A and the rear surface of the spacer receptacle 834 and the remaining plates extend between and are held by two adjacent tines. In this manner, the individual tines 876a–876d of the leaf spring can be deflected as necessary to permit movement of the associated spacer plate relative to the indexing arm 802 outwardly and return the spacer plate inwardly upon park actuation, hence readying the booster to engage one or more additional spacer plates in the next park hold, and release cycle.

Referring now to FIGS. 39–42, the return spring 806 is configured to bias the lower end 822 of the indexing arm 802 towards the accumulator 66. It includes a first end 880 hooked onto the spring seat 632 on the upper end of the indexing arm 802 and a second end 882 hooked onto a seat 884 mounted on the front wall 72 of the master cylinder housing 66. Due to its arrangement and its orientation relative to the actuator arm 804 and the brake pedal protrusion 818, the spring 806 1) extends when the actuator arm 804 is driven by the brake pedal to drive the indexing arm 802 away from accumulator 62, and 2) releases energy to drive the indexing arm 802 back towards the accumulator 62 upon release of the brake pedal 680 (compare FIG. 42 to FIG. 40).

From the operator's standpoint, the braking cycle proceeds exactly as described above. That is, during normal service braking without a latch phase, the operator depresses the brake pedal 680 through a service stroke to apply the brakes, and the brake pedal 680 returns to its released position without interacting with the booster 800 or accumulator 62 at all. When the operator wishes to park the vehicle, he or she depresses the brake pedal 680 beyond the end of the service stroke to the latched position and then releases the pedal 680, after which the brake pedal 680 is held in its latched position by the locking mechanism 654 in the manner described above. The brake pedal 680 remains in its latched position until it is released, either by depression of the brake pedal 680 or depression of the accelerator pedal 682 also as described above. The operator repeats these operations for the duration of his or her use of the vehicle.

The corresponding operation of the booster 800 during these cycles is as follows:

1. Assuming that the initial braking cycle having a park and latch phase commences either upon initial system assembly or after the system has experienced a dramatic temperature drop, the accumulator 62 initially assumes the position illustrated in FIGS. 44 and 45 in which the compression plate 242 rests against the front wall 72 of the master cylinder housing 66. The booster 800 initially assumes a deactivated position in which the indexing arm wall extension 830*a* and spacer plates 810*a*–810*d* all rest against the outer peripheral surface of the compression plate 842.

2. The accumulator 62 remains in its deactivated position during service braking and is not acted upon by the brake pedal 680.

Figure 45:
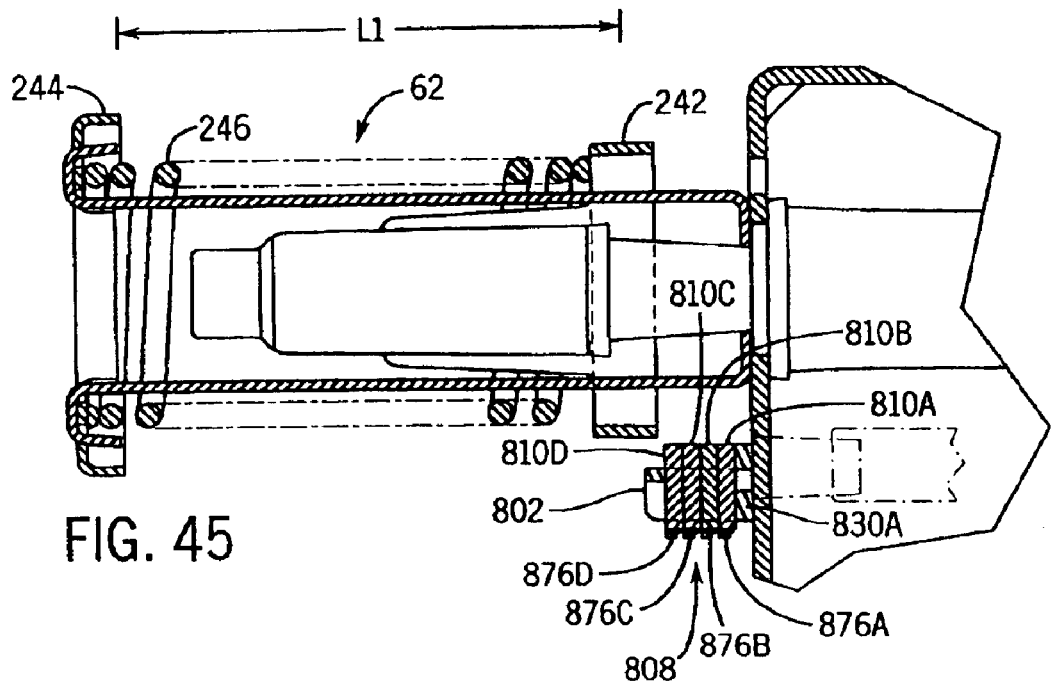

3. When the brake pedal 680 is latched, the master cylinder 60 is retained in its actuated position, and the accumulator compression spring 246 is compressed to a length L1 as best seen in FIG. 45, at which time the compression plate 242 spaced from the master cylinder housing front wall 72. As the brake pedal 680 moves through its overtravel position to its latched position, the protrusion 818 in the brake pedal 680 moves in the direction of the arrow in FIG. 37 to drive the actuator arm 804 through the overtravel position in FIG. 40 and then back to the position of FIGS. 39, 40, and 44. At this time, the spacer plates 810*a*–810*d* are spaced from the peripheral surface of the compression plate 242 by a narrow gap (typically abut 0.05"). This gap is sufficiently wide to permit the compression plate 242 to move axially without interference from the booster 800 but sufficiently narrow to permit rapid engagement with the compression plate 242 upon brake pedal release. Hence, the interaction of the brake pedal 680, booster 800, and accumulator 62 results in automatic movement of the indexing arm 802 into a non-interfering position relative to the accumulator compression plate 242, thereby negating the need for the operator to disengage the booster 800 prior to latching the brake pedal 680.

Figure 46:
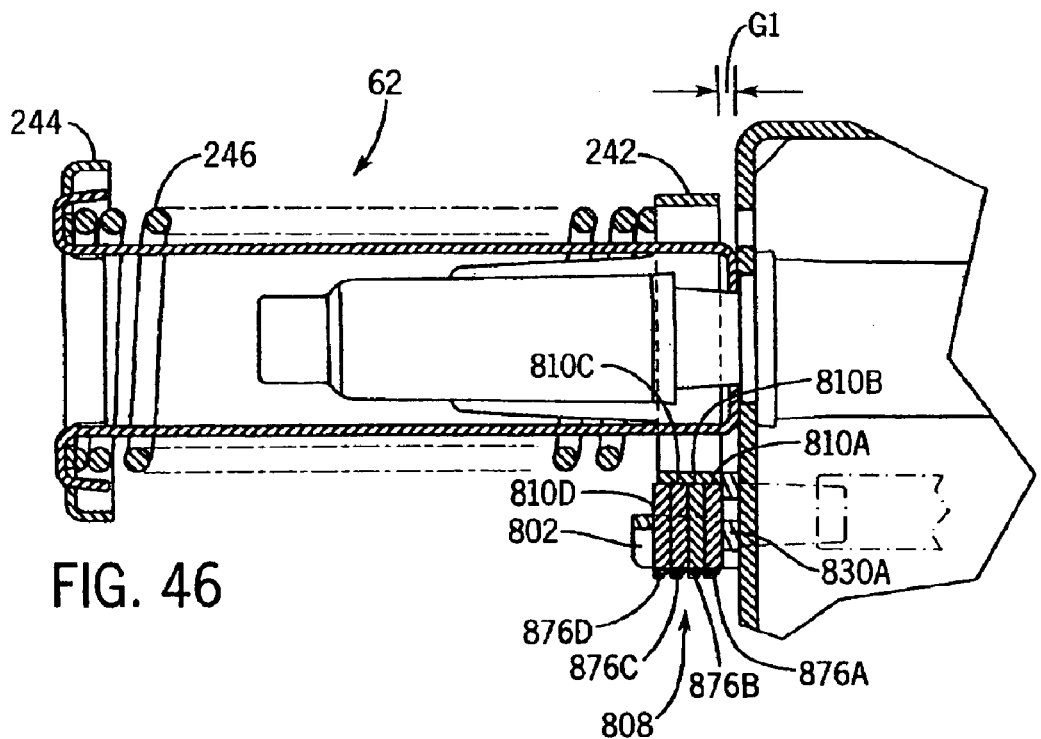

4. When the latched brake pedal 680 is released, either by operation of the brake pedal 680 or operation of the accelerator pedal 682, the protrusion 818 of the brake pedal 680 swings away from the actuator arm 804 of the booster 800 as illustrated by the arrow in FIG. 38, and the return spring 806 drives the indexing arm 802 from the position of FIG. 39 towards the accumulator 62. The compression spring 246 of the accumulator 62 drives the compression plate 242 towards the front wall 72 of the master cylinder housing 66 at this time, but this movement is slowed sufficiently by the resistance imposed by the hydraulic pressure in the brake system to permit at least one plate of the spacer 808 to lodge between the axial end of the compression plate 262 and the front wall 72 of the master cylinder housing 66 as seen in FIG. 46. The axial end of the compression plate is spaced from the front wall 72 of the master cylinder housing 66 by a gap G1 equal to the thickness of a lodged plate(s). The resultant added compression of the spring 246 increases the preload on the compression spring 246 and, accordingly, sets a new, elevated pressurization threshold from which energy accumulation proceeds during the next brake, latch, and release cycle.

While the illustrated example shows only a single plate (i.e., the extension 830*a* on the indexing arm rear wall 830) as being lodged in place at this time, the number of spacer plates that actively engage the compression plate 242 during the first hold and release operation will depend on the relative rates of movement of the compression plate 242 and the indexing arm 802. This, in turn, depends on several factors including the degree to which the system is properly bled. A relatively poorly bled system, having a relatively high volume of trapped air, will experience less accumulator plate movement with each latch, resulting in the lodging of fewer of the plates in the first hold and release event.

Figure 47:
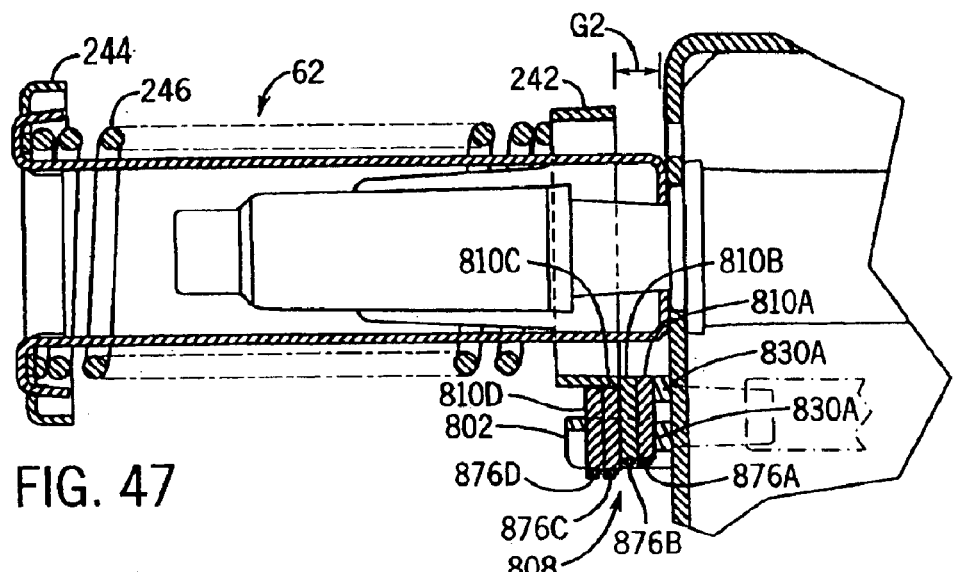
Figure 48:
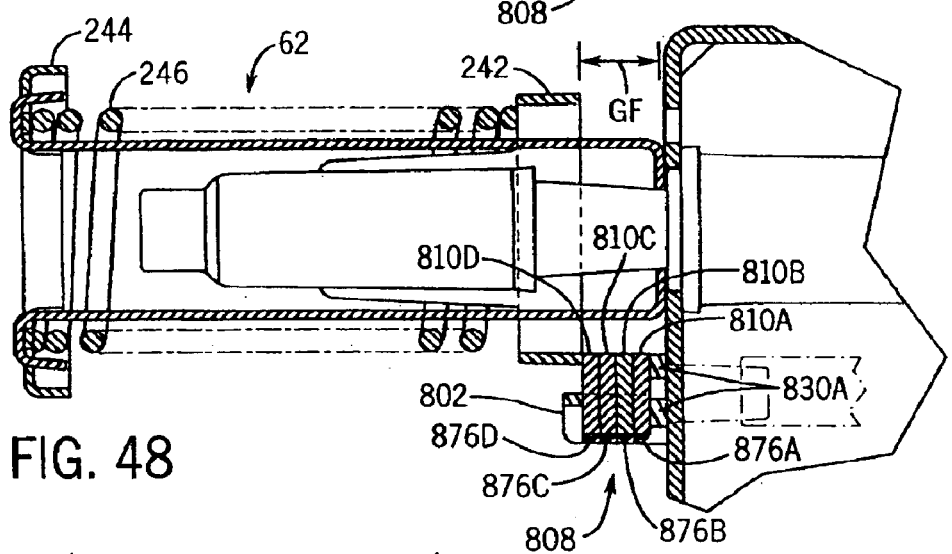

5. During the brake and latch phase of the next braking cycle, the spring is compressed to a length L2 (not shown) that is shorter than the compressed length L1 to which it was compressed in the first cycle, hence storing additional energy. Subsequent release of the pedal during the next release event results in additional plate(s) 810*a*–810*d* being lodged between the end of the compression plate and the front wall of the master cylinder housing as seen in FIG. 47, resulting in the formation of a wider gap G2 between the compression plate 242 and the housing wall 72 that further increases the preload on he spring 246. This in turn sets a still higher threshold for initiation of the next energy storage cycle. At this time, some of the plates 810*a* and 810*d* are driven by the biasing arrangement 812 to their lodged position between the end of the compression plate 242 and the front wall 72 of the master cylinder housing 66. The other plates 810*c* and 810*d* engage the peripheral surface of the compression plate 242 and are deflected away from the indexing arm 802 against the biasing force of biasing arrangement 812.

6. The process described above proceeds through a number M of braking cycles during normal use of the vehicle that will virtually always be higher than the maximum number N of cycles required to fully boost the accumulator 62 (where N equals the number spacer plates in the stack.) Hence, after no more than five braking cycles in the illustrated embodiment, the accumulator 62 assumes the position seen in FIG. 48 in which the compression plate 242 is held at a position that is spaced from the front wall 72 of the master cylinder housing 60 by a gap GF equal to the total thickness of the stack. This thickness is 0.7" in the illustrated embodiment. The resultant 0.7" of spring precompression sets a relatively high preload on the accumulator 62 that results in a corresponding higher pressure accumulation during the park and latch phases of the next and all subsequent braking cycles, resulting in compression of spring through a length LF in FIG. 49 that is greater than the initial compression length L1 in FIG. 45 by 0.7". The additional accumulated energy typically will be in the order of 50 psi of accumulated pressure. The additional energy stored through the additional volume of pressurized fluid trapped in the accumulator is available to compensate for greater temperature drops, hence assuredly holding the brakes in their engaged condition even if the vehicle is subject to a severe temperature drop on the order of 70° F. during that period of non-use.

Figure 49:
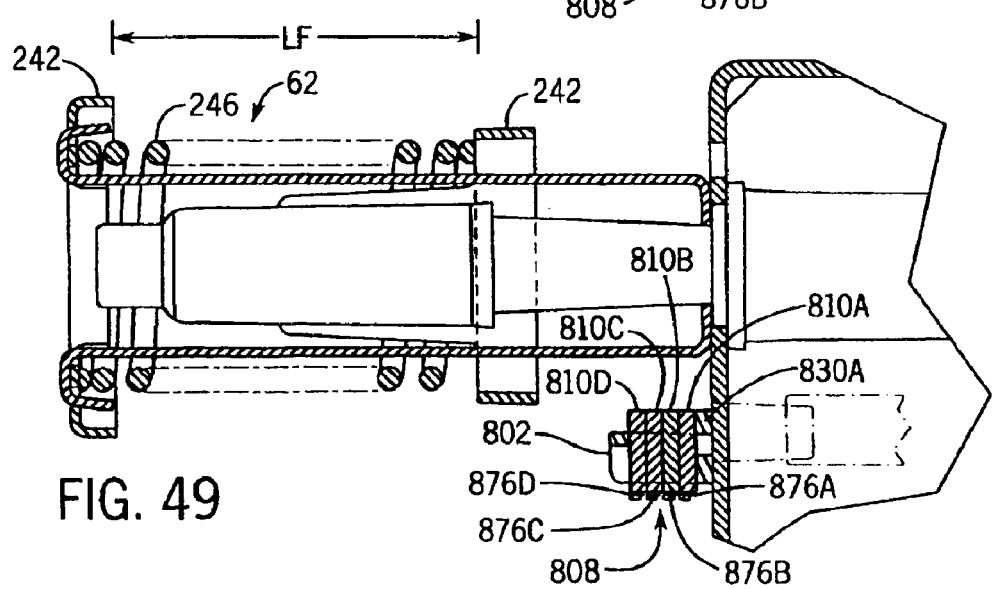
Figure 50:
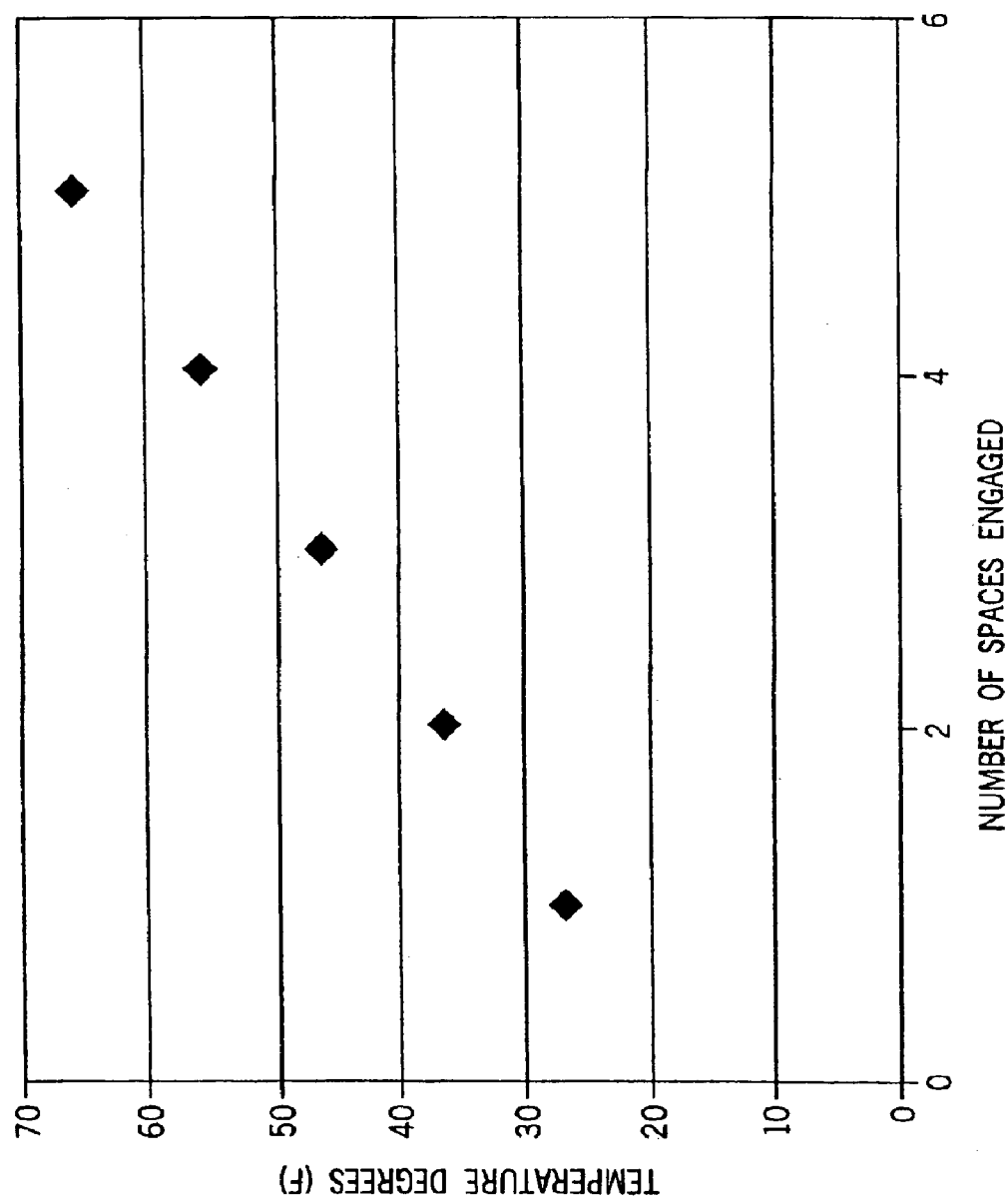
FIG. 50 graphically illustrates the booster's ability to compensate for temperature drops in its hydraulic system at various levels of booster engagement.

The energy accumulation enhancement effect of the progressive boosting described above is illustrated graphically in FIG. 50, which shows the degree of thermal compensation available in the system after each successive plate in the stack is activated to boost the accumulator 62. This graph illustrates that the system can accommodate approximately 10–15° F. of additional temperature drop without experiencing creep for each spacer plate that comes into play. Hence, by the time that the accumulator is fully boosted as seen in FIG. 49, the system is capable of accommodating over 65° F. of additional temperature drop without fully expending the accumulated energy when compared to the unboosted system of FIGS. 1–31.

The system described above has numerous advantages over prior known systems in addition to those discussed above. For instance, it permits the park and hold braking of all of the brakes on the vehicle. This is in contrast to the typical cable actuated system, which engages only the rear brakes in a four-wheeled vehicle. Better park braking at lower pressures therefore is obtained.

In addition, when used in a dual-outlet or other multi-outlet master cylinder system, the accumulator can be configured to act on either all or less than all brakes, depending on where the accumulator is located relative to the master cylinder stages.

Many changes and modifications could be made to the invention without departing from the spirit thereof. Some of these changes are discussed above. Other changes will become apparent from the appended claims.

We claim:

1. A vehicular brake system comprising:
   (A) at least one hydraulically actuated vehicle brake;
   (B) a brake pedal which is movable through a braking cycle in which said brake pedal moves from a released position, through a service braking stroke, to a latched position, is latched in the latched position, and then moves back to the released position;
   (C) a master cylinder housing which has a front wall;
   (D) a master cylinder which is mounted on said housing, which has an inlet in fluid communication with a hydraulic fluid reservoir and an outlet in fluid communication with said brake, which is actuated by said brake pedal to engage said brake when said bake pedal travels through said service braking stroke, and which is latched in said actuated position when said brake pedal is latched in said latched position thereof;
   (E) a hydraulic accumulator which is coupled to said master cylinder, which extends toward said front wall of said mounting bracket, and which is dimensioned and configured to store energy generated by said master cylinder upon actuation thereof and to use said energy to assist in holding said brake in the engaged condition thereof when said master cylinder is locked in said actuated position thereof, said accumulator including 1) a compression spring having an outer, stationary end and an inner, movable end and 2) a compression plate on which said inner end of said spring rests; and
   (F) a booster which is automatically operated during at least a portion of a first braking cycle of said brake system to boost an energy storage level of said accumulator during another, subsequent braking cycle without requiring manual deactivation of said booster, said booster comprising
   1) an indexing arm which is pivotably mounted on said front wall of said mounting bracket;
   2) a stack of spacer plates which are mounted on said indexing arm, and each of which has an inner surface which faces said compression plate and an outer surface which is disposed opposite said inner surface,
   3) a biasing arrangement which biases said spacer plates toward said compression plate and which permits limited movement of said spacer plates relative to said indexing arm upon contact between said spacer plates and a peripheral surface of said compression plate,
   4) a return spring which biases said indexing arm toward a position in which said spacer plates engage said compression plate, and
   5) an actuator arm which extends rearwardly from said indexing arm toward said brake pedal, wherein said actuator arm cooperates with said brake pedal such that,
      a) during movement of said brake pedal into the latched position following a service braking stroke, said actuator arm is driven by said brake pedal to move said indexing arm into a disengaged position in which all of said spacer plates are spaced radially from said peripheral surface of said compression plate in order to permit unhindered axial movement of said compression plate past said spacer plates, and
      b) upon release of said brake pedal from said latched position, said return spring automatically moves said indexing arm to an engaged position in which at least one spacer plate of said stack is lodged between an axial surface of said compression plate and said front wall of said master cylinder housing.

* * * * *